United States Patent
Wesling et al.

(10) Patent No.: US 7,163,223 B2
(45) Date of Patent: Jan. 16, 2007

(54) LOCKOUT MECHANISM FOR A SUSPENSION SYSTEM

(75) Inventors: Kevin F. Wesling, Lombard, IL (US); Brian T. Jordan, Chicago, IL (US); Christopher A. Shipman, Chicago, IL (US); John D. Cheever, Chicago, IL (US); Edward Herrington, Colorado Springs, CO (US); James Osborne, Colorado Springs, CO (US)

(73) Assignee: Sram Corporation, Chicago, IL (US)

( * ) Notice: Subject to any disclaimer, the term of this patent is extended or adjusted under 35 U.S.C. 154(b) by 67 days.

(21) Appl. No.: 10/707,079

(22) Filed: Nov. 19, 2003

(65) Prior Publication Data

US 2005/0104320 A1   May 19, 2005

(51) Int. Cl.
*B62K 21/00*    (2006.01)
*F16K 17/26*    (2006.01)
*F16F 9/34*     (2006.01)

(52) U.S. Cl. .................. 280/276; 137/493.4; 251/285; 188/319.2

(58) Field of Classification Search ............ 188/319.1, 188/319.2, 322.14; 267/33, 35, 120, 64.12; 280/276; 137/493.4, 12; 251/285
See application file for complete search history.

(56) References Cited

U.S. PATENT DOCUMENTS

| | | | | |
|---|---|---|---|---|
| 3,321,051 A | * | 5/1967 | Heckethorn | 188/315 |
| 3,470,986 A | * | 10/1969 | Whisler, Jr. | 188/269 |
| 4,971,344 A | * | 11/1990 | Turner | 280/276 |
| 5,308,099 A | * | 5/1994 | Browning | 280/276 |
| 5,478,099 A | * | 12/1995 | Kawahara | 280/276 |
| 5,542,509 A | * | 8/1996 | Bell | 188/322.14 |
| 5,634,653 A | * | 6/1997 | Browning | 280/276 |
| 5,848,675 A | * | 12/1998 | Gonzalez | 188/319.2 |
| 6,105,987 A | * | 8/2000 | Turner | 280/276 |
| 6,120,049 A | | 9/2000 | Gonzalez | |
| 6,217,049 B1 | | 4/2001 | Becker | |
| 6,360,858 B1 | * | 3/2002 | Gonzalez et al. | 188/319.2 |
| 6,382,370 B1 | | 5/2002 | Girvin | |
| 6,505,719 B1 | * | 1/2003 | Gonzalez et al. | 188/319.2 |
| 6,592,136 B1 | * | 7/2003 | Becker et al. | 280/276 |

(Continued)

FOREIGN PATENT DOCUMENTS

DE    WO 00/31435    *    6/2000

(Continued)

*Primary Examiner*—Lesley D. Morris
*Assistant Examiner*—Daniel Yeagley
(74) *Attorney, Agent, or Firm*—Milan Milosevic; Lisa Serdynski

(57) ABSTRACT

A suspension system that includes a simplified lockout mechanism and an adjustable blow-off mechanism. The system includes a valve mechanism and a valve actuating assembly, a valve mechanism housing and a resilient member disposed between the valve mechanism and the valve mechanism housing. The valve mechanism is slidably mounted along the valve mechanism housing and it separates a first chamber from a second chamber. The valve actuating assembly operates the valve mechanism between open and closed positions. The resilient member is configured to be deformable by the valve mechanism as the valve mechanism is slidably displaced by an increasing pressure in the first fluid chamber. The sliding valve mechanism is configured to collide against the valve actuating assembly when a blow-off pressure is reached in the first fluid chamber switching the valve mechanism from the closed position to the open position.

82 Claims, 23 Drawing Sheets

U.S. PATENT DOCUMENTS 6,651,788 B1 * 11/2003 Wohlfarth .............. 188/322.14
6,662,914 B1 * 12/2003 Honig et al. ........... 188/322.15
6,802,407 B1 * 10/2004 Chen ....................... 188/319.2
6,986,414 B1 *  1/2006 Honig et al. ............. 188/282.9
7,004,186 B1 *  2/2006 Ferrel ......................... 137/12

FOREIGN PATENT DOCUMENTS

TW          560486 Y    11/2003

* cited by examiner

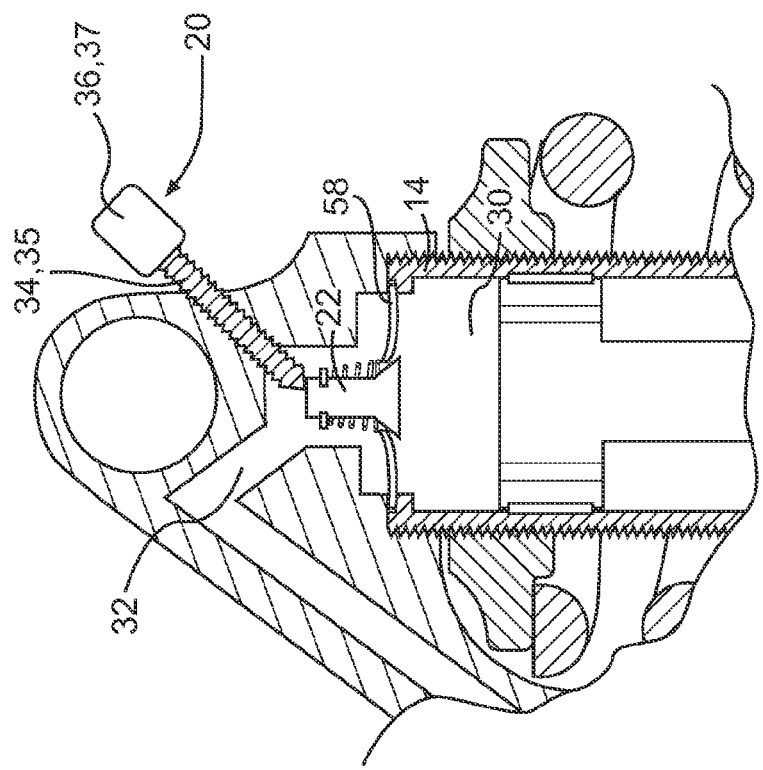
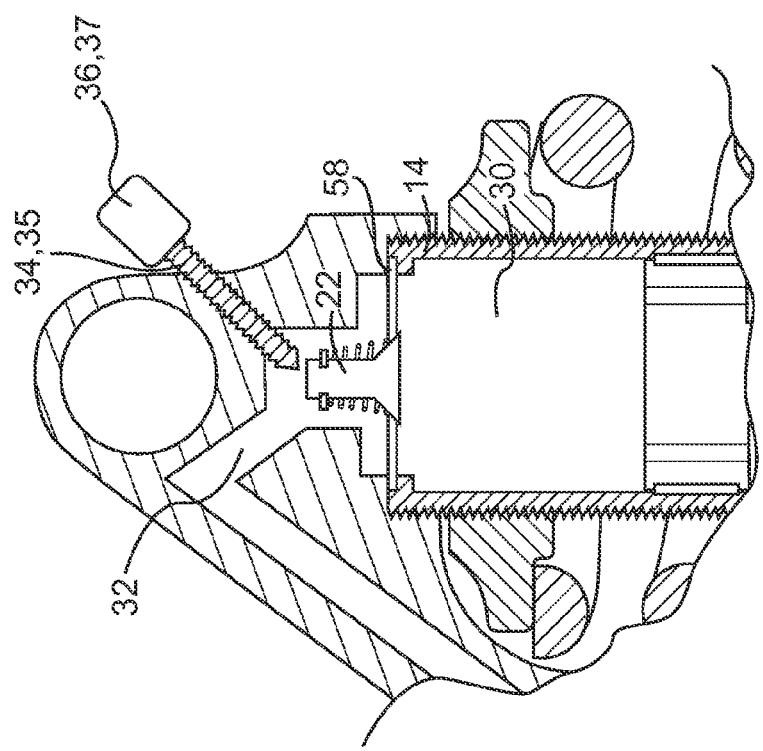

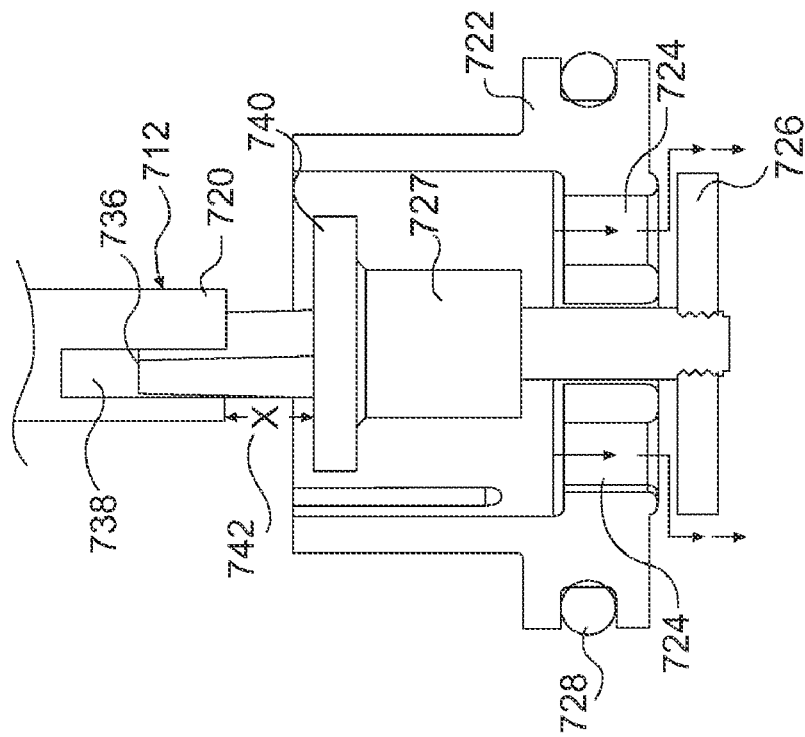
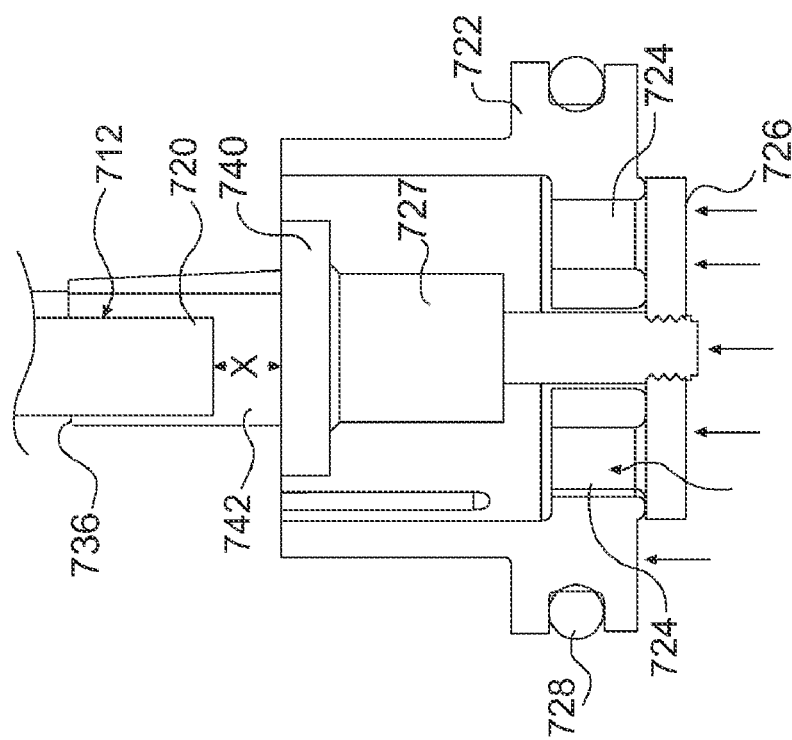

LOCKOUT MECHANISM FOR A SUSPENSION SYSTEM

BACKGROUND OF INVENTION

The present invention relates to suspension systems and more particularly to a simplified lockout device for a suspension system that includes an adjustable "blow-off" mechanism. The present invention also relates to a simplified flow restrictive device for a suspension system that includes an adjustable pressure relief mechanism.

Suspension systems, typically used on handlebar-steered vehicles such as bicycles and motorcycles, are designed to absorb the impacts and vibrations typically experienced by riders when the bicycle traverses irregularities on the riding surface. Suspension systems may be positioned in or proximate to the front and rear forks, seat tube, head tube, and other bicycle frame locations to insulate the rider from vibrations and impacts. Suspension performance may be affected by various factors such as rider weight, rider skill and terrain conditions. One particular factor that may affect suspension performance is rider induced, namely, the pedaling force exerted by the rider on the frame of the bicycle. The pedaling action of the rider loads the suspension, resulting in up and down bobbing motion of the bicycle. On rough terrain, some bobbing motion is an acceptable side effect of a fully active suspension capable of absorbing large bumps. Generally however, on smooth terrain, this motion dissipates the rider's energy, energy that could be used to propel the bicycle forward.

To solve this problem, bicycle suspension systems have been designed with a device that allows the suspension to be turned on or off. When the suspension is on, it is active and displaces in response to bumps in the road. When the suspension is off or "locked out", it becomes substantially rigid and does not displace in response to road irregularities. In a suspension system that is hydraulically dampened, the suspension typically includes a pair of telescopically arranged cylinders, a compression piston, a valve mechanism that defines two fluid chambers and a lockout mechanism manually operable by the rider between closed and open positions to control fluid flow between the two chambers. Generally, the suspension dampens or slows down the speed of the fork in response to an applied load as the fluid is forced across the valve mechanism through a restrictive orifice. The size of the orifice determines the amount of damping that will occur. To completely restrict the flow of the fluid, the valve mechanism may be closed to cover the orifice and the fork becomes substantially rigid or locked out.

One problem associated with prior art lockout mechanisms is that damage may occur to the system while in the lockout mode under a large jarring compression load. To prevent such damage, a blow-off mechanism may be provided to relieve the pressure on the suspension when an applied force reaches a critical level. Usually, the blow-off includes a valve mechanism separate from the lockout valve mechanism. Typically, the blow-off valve mechanism is biased toward a closed position by a preloaded spring and is opened when the fluid pressure produced by the compression of the lockout piston is high enough to overcome the force of the preloaded spring. Once the blow-off valve has "blown off," a lightly sprung return valve allows the fluid to return to the compression chamber. The blow-off and return valves are typically both one-way valves that permit flow in only one direction. There are several problems with this configuration including the complexity and higher cost of having three different valve mechanisms, including the additional parts needed to actuate the valves, and the need to machine three valve quality surfaces.

Another problem associated with conventional blow-off mechanisms is the inability to adjust the blow-off force. For example, pedaling forces will typically be higher for a heavier rider than for a lighter rider requiring a higher blow-off setting. A blow-off force, properly set to prevent a heavier rider from blowing off the fork while pedaling, may be set too high for a lighter rider to reach blow-off under normal riding conditions. Therefore, there is a need to provide a bicycle suspension with a lockout mechanism that has fewer parts and an adjustable blow-off mechanism.

SUMMARY OF INVENTION

The present invention provides a bicycle suspension system having a simple lockout mechanism and an adjustable blow-off mechanism. The suspension system typically includes an inner tube telescopically engaged with an outer tube along an axis. A compression piston assembly is slidably mounted in the inner tube and reciprocates within the inner tube upon compression and expansion of the inner and outer tubes. The lockout mechanism includes a valve mechanism and a valve actuating assembly. The valve mechanism may be slidably mounted in the inner tube and performs the functions of a lockout valve, a blow-off valve and a return valve. The valve mechanism divides the inner tube into first and second fluid chambers, and controls fluid flow between the chambers. The valve actuating assembly switches the valve mechanism between an open position in which fluid flow is permitted between the chambers and a closed position in which fluid flow between the chambers is blocked.

The valve mechanism generally includes a valve and a valve seat slidably mounted in the inner tube. The valve seat includes at least one orifice for allowing fluid flow between the first and second chambers. The valve preventing fluid flow between the chambers is positionable to cover the orifice. A valve stem at one end of the valve is configured to be engageable by the valve actuating assembly to open and close the valve mechanism.

The valve actuating assembly may include an actuator and a driver for permitting selection between an "off" position in which fluid flows between the chambers permitting the fork to absorb loading, and an "on" position in which the fluid is substantially inhibited from flowing between the chambers, the fork behaving substantially like a rigid fork. The rider operates the actuator to operatively displace the driver, the driver in turn switching the valve mechanism between its open and closed positions.

In one embodiment the actuator may include a knob located at the top of the inner tube operably connected to a cam reciprocally displacing the driver, the knob rotatable by a rider to switch the lockout mechanism on and off. Alternatively, the driver may be rotatable and operatively connected to the valve mechanism such that upon rotation of the driver the valve mechanism may be opened and closed depending on the direction of rotation.

The blow-off mechanism includes a resilient member disposed between the valve mechanism and one end of the inner tube and configured to be deformable by the valve mechanism as the valve mechanism is slidably displaced by an increasing pressure in the first chamber. At the blow-off pressure, the valve collides against a valve stop member, typically the driver of the valve actuating assembly, switching the valve mechanism open to permit fluid flow into the second chamber.

The blow-off pressure at which the valve mechanism opens may be adjusted by the rider. The stiffness of the resilient member, as it is compressed to close the gap between the valve mechanism and the driver, determines the pressure at which the valve mechanism will blow-off. The distance between the valve mechanism and the driver may be adjusted by a setscrew located at an end of the driver opposite the end that engages the valve mechanism. The setscrew may be rotated to move the driver toward or away from the valve mechanism, thereby adjusting the blow-off pressure.

In other embodiments of the present invention including flow restrictive mechanisms instead of lockout mechanism, the valve mechanism need not be fully closed to the lockout position. Instead, flow across the valve mechanism may be further restricted under increasing pressure, but remains partially open until a desired threshold pressure is reached, at which time the valve mechanism collides against the valve actuating assembly resulting in pressure relief back to a more open valve position.

In yet further embodiments of the present invention, the lockout and flow restrictive mechanisms may alternatively be housed in the compression piston assembly itself or within a reservoir housing separate from, but in fluid communication with, the tube housing the compression piston.

These and other features and advantages of the present invention will be more fully understood from the following description of certain embodiments of the invention, taken together with the accompanying drawings.

BRIEF DESCRIPTION OF DRAWINGS

In the drawings:

FIGS. 9a–9b are cross-sectional views of another embodiment of the present invention, showing in particular, the valve mechanism housed in the piston assembly of one leg of a front suspension fork, FIG. 9b showing a blow-up of detail A of FIG. 9a;

FIGS. 11a–11b are cross-sectional views of another embodiment of the present invention, showing in particular, a valve seat formed integrally with a resilient member and a seal;

FIG. 21 is a partial cross-sectional view of the lockout mechanism of FIG. 19 showing the valve mechanism in the open position;

FIG. 22 is a partial cross-sectional view of the lockout mechanism of FIG. 19 showing the valve mechanism during a return stroke.

DETAILED DESCRIPTION

Figure 1:
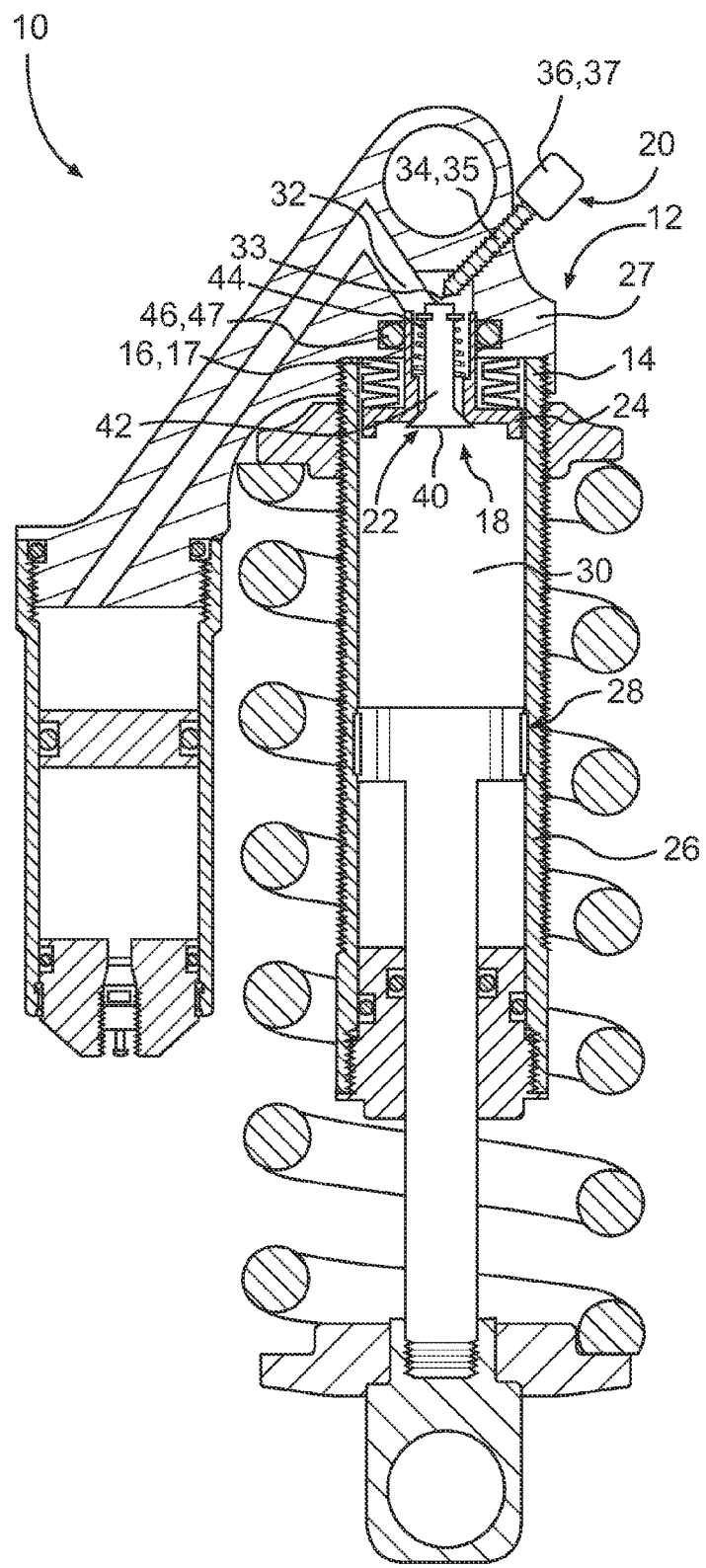
FIG. 1 is a cross-sectional view of the suspension system of the present invention, showing in particular, the valve mechanism housed in the piston tube.

A suspension system 10 is shown in FIGS. 1–3 comprising a lockout mechanism 12, a valve mechanism housing 14, and a resilient member 16. The lockout mechanism includes a valve mechanism 18 and a valve actuating assembly 20. The valve mechanism 18 includes a valve 22 and a valve seat 24, the valve 22 displaceable relative to the valve seat 24, and in turn, the valve seat 24 and the valve mechanism 18 slidably mounted along the valve mechanism housing 14. In the embodiment of FIGS. 1–3, the valve mechanism housing 14 forms a portion of a piston tube 26 within which a compression piston assembly 28 is slidably mounted. The valve mechanism 18 separates a first fluid chamber 30 from a second fluid chamber 32 and controls fluid flow therebetween. The piston assembly 28 is displaceable toward the valve mechanism 18 to increase the fluid pressure in the first chamber 30.

The valve actuating assembly 20 further includes a driver 34 that is displaceable relative to the valve mechanism housing 14 to operatively engage the valve mechanism 18, and an actuator 36 that is operatively connected to the driver 34. In the embodiment of FIGS. 1 3, driver 34 includes a screw 35 threadably displaceable relative to the valve mechanism housing 14, while actuator 36 includes a rider-adjustable knob 37 formed integrally with the driver 34. As previously described, both the valve mechanism 18 and the valve actuating assembly 20 are associated with the valve mechanism housing 14. Accordingly, the valve mechanism housing 14 is not limited to simply a portion of the piston tube 26 but, in the embodiment of FIGS. 1–3, includes a portion of the suspension structure 27 receiving the valve actuating assembly 20.

The valve 22 further includes a valve head 40 and a valve stem 42 connected to the valve head 40, the valve head 40 configured to sealingly engage the valve seat 24, the valve stem 42 configured to interface with the driver 34. The present invention may further include a valve spring 44 associated with the valve stem 42 to bias the valve 22 against the valve seat 24, and a seal 46 disposed between the valve seat 24 and the valve mechanism housing 14. In the embodiment of FIGS. 1 3, an O-ring 47 is shown. Of course, various degrees of sealing between the valve head 40 and valve seat 24, and across the seal 46 are contemplated by the present invention.

The resilient member 16 is disposed between the valve mechanism 18 and the valve mechanism housing 14. In the embodiment of FIGS. 1–3, a coil spring 17 is shown between the valve seat 24 and the suspension structure 27, and is configured to be deformable by the valve mechanism 18 as the valve mechanism 18 is slidably displaced by an increasing pressure in the first chamber 30 caused by motion of the piston assembly 28 toward the valve mechanism 18.

Figure 2A:
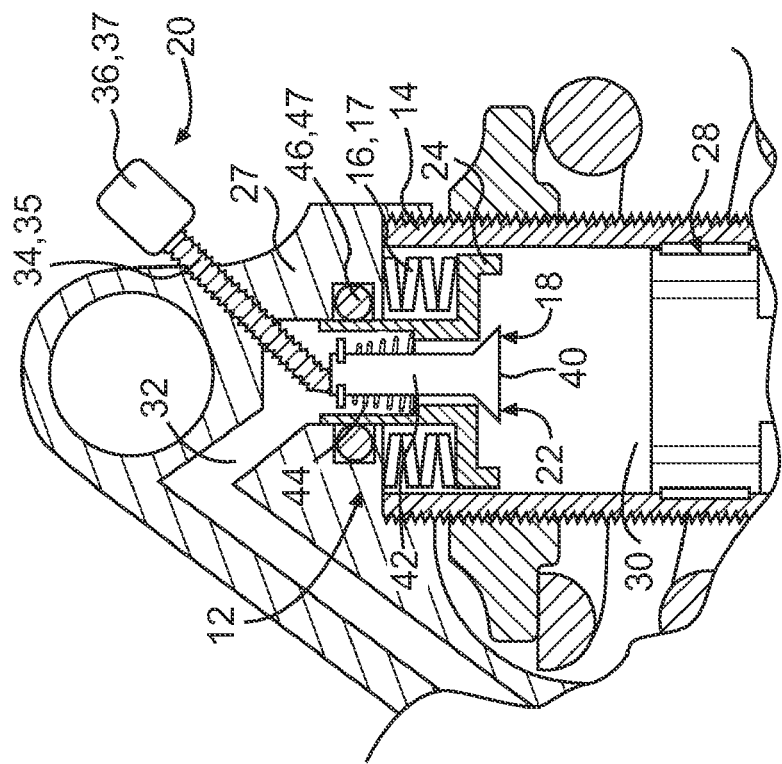
FIG. 2a is a cross-sectional view of the suspension system of FIG. 1, showing in particular, the valve mechanism in a closed position.
Figure 2B:
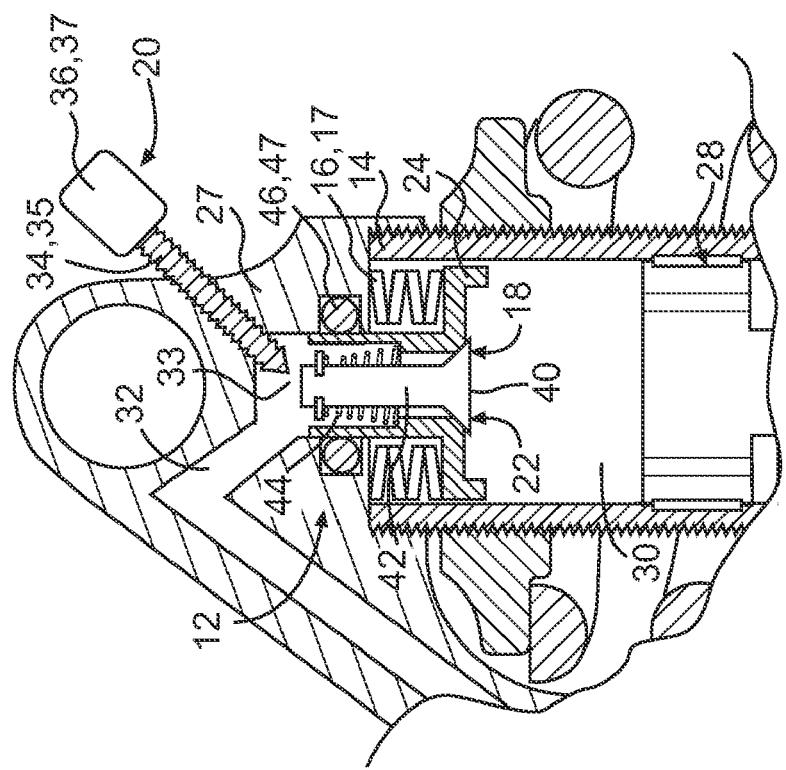
FIG. 2b is a cross-sectional view of the suspension system of FIG. 1, showing in particular, the valve mechanism in a open position.

The valve actuating assembly 20 of the embodiment of FIGS. 1–3 is adjustable to switch the valve mechanism 18 between an open position (FIG. 2*b*) and a closed position (FIG. 2*a*). When the valve mechanism 18 is adjusted in an open position, the driver 34 displaces the valve 22 away from engagement with the valve seat 24, working against the biasing force of the valve spring 44, to permit fluid flow between the first and second chambers 30, 32. So positioned, bi-directional fluid flow is permitted between the chambers 30, 32 in response to reciprocal displacement of the piston assembly 28 within the piston tube 26. When the rider wants to lockout the suspension, making it substantially rigid, the rider may adjust in this embodiment, rotate—the knob 37 to withdraw the driver 34 away from engagement with the valve stem 42 to permit the valve spring 44 to bias the valve head 40 into engagement with the valve seat 24, thereby substantially blocking fluid flow between the first and second chambers 30, 32.

Figure 3A:
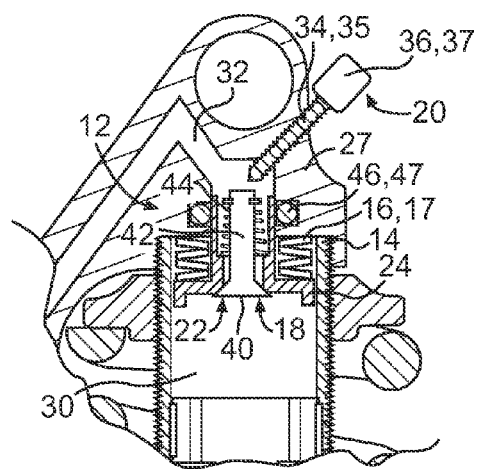
FIGS. 3a–3d are cross-sectional views of the suspension system of FIG. 1, showing in particular, a sequence of valve mechanism positions for a lockout mechanism including a valve spring.
Figure 3B:
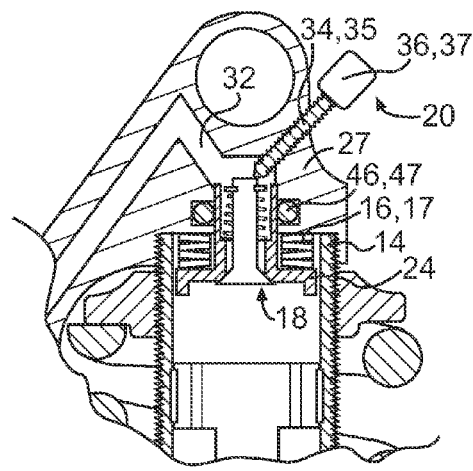
Figure 3C:
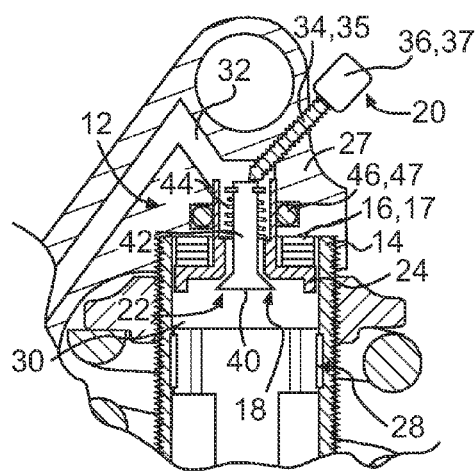
Figure 3D:
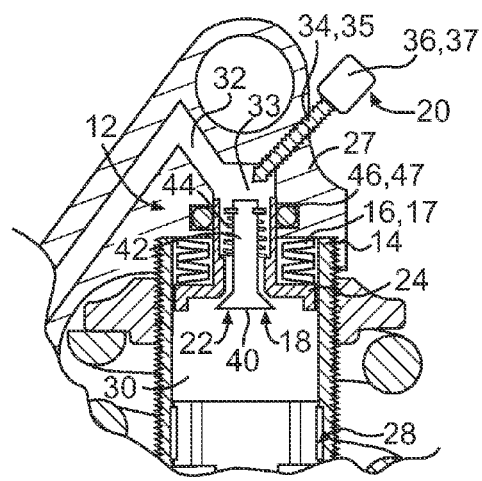

Looking to FIGS. 3*a*–3*d*, an operating sequence of the lockout mechanism 12 will be described. In FIG. 3*a*, the valve mechanism 18 is shown in a closed position, so biased by the valve spring 44, with the resilient member 16 shown fully extended. As the piston 28 is deflected toward the valve mechanism 18, the valve head 40 continues to be biased in a closed position against the valve seat 24, now under the force of both the valve spring 44 and the increasing pressure in the first fluid chamber 30, while the resilient member 16 is partially compressed by the valve mechanism 18 as the valve mechanism 18 is slidably deflected toward the driver 34 by the increasing pressure in the first fluid chamber 30. As the valve mechanism 18 continues to slide, the valve stem 42 will collide against a valve stop member, in this embodiment the driver 34 thereby blocking continued deflection of the valve 22, but not the valve seat 24, as shown in FIG. 3*b*. With continued sliding of the valve seat 24, the resilient member 16 will be further compressed thereby releasing or blowing off the sealing engagement between the valve head 40 and the valve seat 24 to permit fluid flow from the first fluid chamber 30 into the second fluid chamber 32, as shown in FIG. 3*c*. This blow-off condition will relieve the pressure buildup in the first fluid chamber 30, switching the suspension from substantially rigid to compliant and permitting the previously rigid suspension to absorb a sudden jarring impact that would otherwise possibly cause damage to the suspension had the locked condition been maintained. Under the rebound stroke of piston 28, when the piston withdraws away from the valve mechanism 18, the resilient member 16 returns to its uncompressed state and the valve head 40 is drawn away from the valve seat 24 by fluid flow from the second chamber 32 to the first chamber 30, against the force of the valve spring 44. The rider may adjust the blow-off pressure by adjusting the position of the driver 34, and in turn, the size of a gap 33 between the driver 34 and the valve stem 42. It is further understood that the blow-off and return stroke characteristics way also be adjusted by varying the stiffness of the resilient member 16 and the valve spring 44.

Figure 4A:
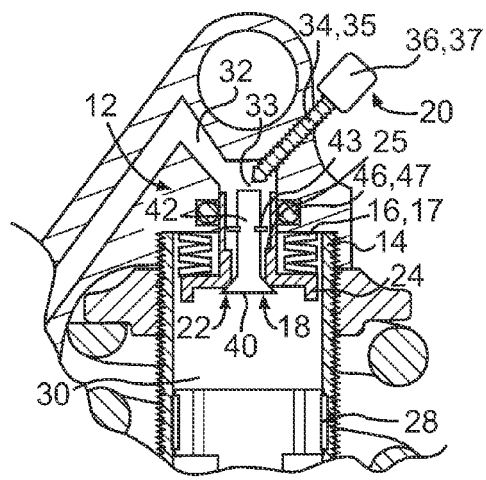
FIGS. 4a–4d are cross-sectional views of another embodiment of the present invention, showing in particular, a sequence of valve mechanism positions for a lockout mechanism excluding a valve spring.
Figure 4B:
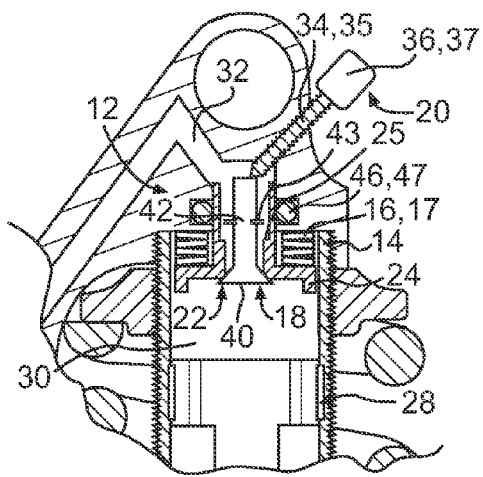
Figure 4C:
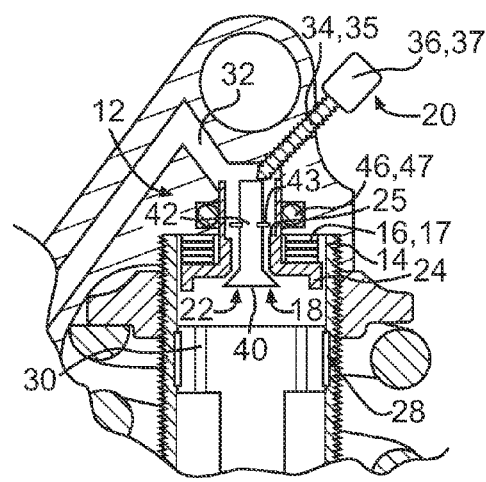
Figure 4D:
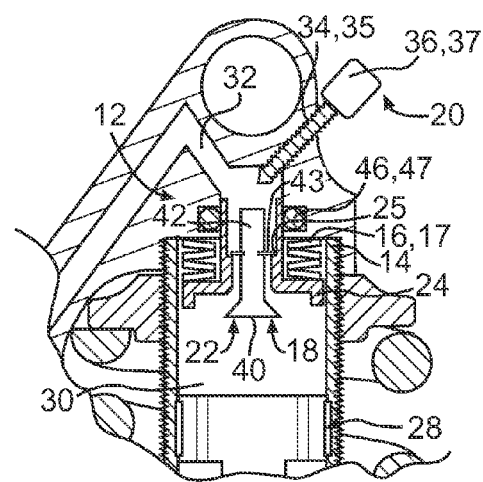

In another embodiment of the present invention shown in FIGS. 4*a*–4*d*, the lockout mechanism 12 shown in FIGS. 1–3 is described without the use of the valve spring 44. In the embodiment of FIGS. 4*a*–4*d*, the valve 22 may include a retaining ring 43 attached to the valve stem 42 that prevents the valve from escaping the valve seat 24 as the retaining ring abuts a shoulder 25 of the valve seat 24. The retaining ring 43 is configured to permit fluid flow across it in both directions. So configured, the range of motion of the—now floating—valve 22 will vary depending on whether the driver 34 is adjusted to prevent lockout (similar to FIG. 2*b*) or permit lockout to occur (similar to FIG. 2*a*). If adjusted to prevent lockout, the range of motion of the valve 22 is limited on one side by contact between the retaining ring 43 and the valve seat shoulder 25, and on the other side by contact between the valve stem 42 and the driver 34. If the driver 34 is adjusted to permit lockout, the range of motion of the valve 22 is limited on one side by contact between the retaining ring 43 and the valve shoulder 25, and on the other side by contact between the valve head 40 and the valve seat 24. Looking to the FIGS. 4*a*–4*b*, a cycle of operation will described with the driver 34 adjusted to permit lockout. Under increasing pressure in the first fluid chamber 30 caused by deflection of the piston 28 toward the valve mechanism 18, the floating valve 22 will be biased toward the valve seat 24, the valve head 40 engaging the valve seat 24 before the resilient member 16 is compressed (FIG. 4*a*). Under increasing pressure in the first fluid chamber 30, the valve 22 will continue to engage the valve seat 24 as the resilient member 16 is partially compressed by the deflection of valve mechanism 18 toward the driver 34 with contact resulting between the valve stem 42 and the driver 34 9 (FIG. 4*b*). This will prevent further deflection of the valve 22 but not the valve seat 24. With continued deflection of the valve seat 24, the resilient member 16 is further compressed until the sealing contact between the valve head 40 and the valve seat 24 is cracked open or blown off to relieve the mounting pressure in the first fluid chamber 30 by permitting fluid flow from the first fluid chamber 30 into the second fluid chamber 32 (FIG. 4c). On the return stroke of the piston 28, i.e. motion of the piston 28 away from the valve mechanism 18, the resilient member 16 returns to its uncompressed state, and the valve 22 is driven away from the valve seat 24 by the return flow of fluid from the second chamber 32 into the first chamber 30.

Although the embodiments of FIGS. 1–4 describe a lockout mechanism 12 capable of substantially blocking fluid flow between the first and second fluid chambers 30, 32, to achieve a substantially rigid suspension, the present invention is not limited to a lockout condition. In the embodiments of FIGS. 5–6, a flow-restrictive mechanism 112 replaces the lockout mechanism 12 of the previously described embodiments, the flow-restrictive mechanism also including a valve mechanism 118 and the valve actuating assembly 20. The valve mechanism 118 is operable between an open condition in which fluid flow between the first and second chambers 30, 32 is permitted, and a restrictive position in which less fluid flow is permitted between the first and second fluid chambers 30, 32 than in the open position. The reduced fluid flow of the restrictive position may approach, but does not achieve the lockout condition. In the embodiments of FIGS. 5–6, the valve mechanism 118 includes the valve seat 24 and a valve 122 that may include an orifice 48 connecting the first and second fluid chambers 30, 32, as well as a valve head 140 and valve stem 142. The orifice 48 remains open during the operating sequence of the valve 122 to prevent a lockout condition.

Figure 5A:
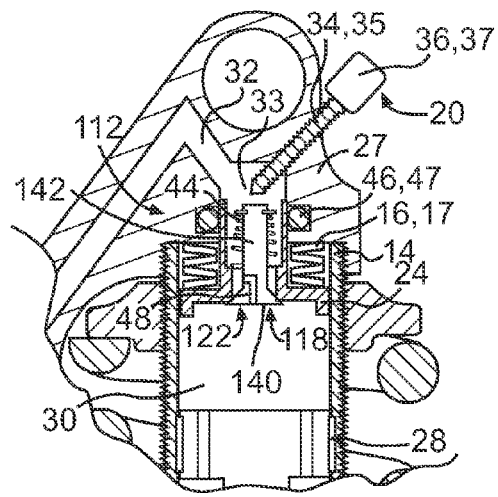
FIGS. 5a–5d are cross-sectional views of another embodiment of the present invention, showing in particular, a sequence of valve mechanism positions for a flow restrictive mechanism system including a valve spring.
Figure 5B:
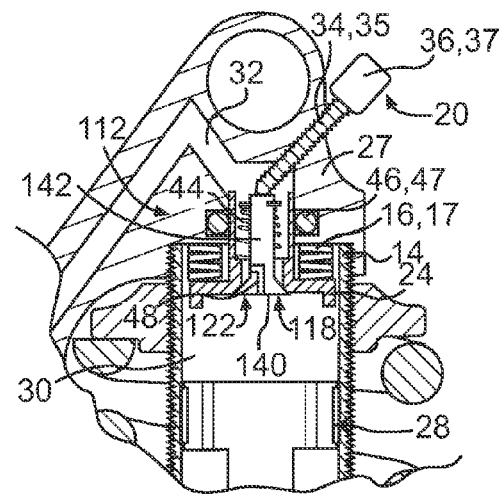
Figure 5C:
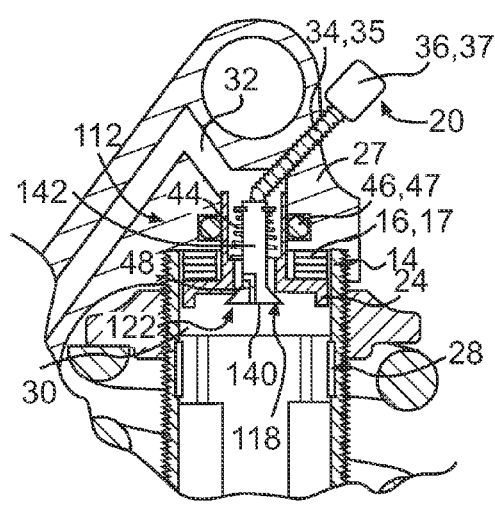
Figure 5D:
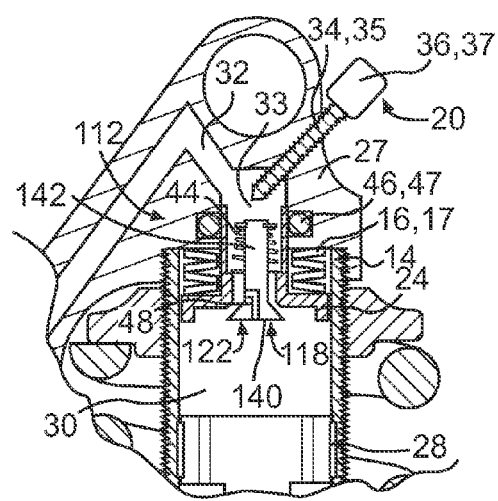

Looking to FIGS. 5a–5d, an operating sequence of the flow-restrictive mechanism 112 will be described. In FIG. 5a, the valve mechanism 118 is shown in a restrictive position, the valve 122 biased against the valve seat 24, but with restricted fluid flow still permissible between the first and second chambers 30, 32 along orifice 48. Additionally, the resilient member 16 shown fully extended. As the piston 28 is deflected toward the valve mechanism 118, the valve 122 continues to be biased against the valve seat 24, now under the force of both the valve spring 44 and the increasing pressure in the first fluid chamber 30, while the resilient member 16 is partially compressed by the valve mechanism 118 as the valve mechanism 118 is slidably deflected toward the driver 34 by the increasing pressure in the first fluid chamber 30. As the valve mechanism 118 continues to slide, the valve stem 142 will collide against the driver 34 thereby blocking continued deflection of the valve 122, as shown in FIG. 5b. With continued sliding of the valve mechanism 118, the resilient member 16 will be further compressed thereby cracking or releasing the sealing engagement between the valve head 140 and the valve seat 24 to permit fluid flow between the valve 122 and the valve seat 24 in addition to the existing fluid flow through the orifice 48—from the first fluid chamber 30 into the second fluid chamber 32, as shown in FIG. 5c. This condition will relieve the pressure buildup in the first fluid chamber 30, switching the suspension from less compliant and if properly adjusted, approaching but not reaching a substantially rigid condition—to more compliant, permitting the previously less compliant suspension to absorb a sudden jarring impact that would otherwise possibly cause damage to the suspension had the restricted condition been maintained. Under the rebound stroke of piston 28, when the piston withdraws away from the valve mechanism 118, the resilient member 16 returns to its uncompressed state and the valve head 140 is drawn away from the valve seat 24 by additional fluid flow from the second chamber 32 into the first chamber 30 against the force of the valve spring 44. The rider may adjust the threshold pressure at which pressure relief occurs by adjusting the position of the driver 34, and in turn, the size of the gap 33 between the driver 34 and the valve stem 142. It is further understood that the pressure relief and return stroke characteristics may also be adjusted by varying the stiffness of the resilient member 16 and the valve spring 44.

In another embodiment of the present invention shown in FIGS. 6a–6d, the flow-restrictive mechanism shown in FIGS. 5a–5d is described without the use of the valve spring 44. In the embodiment of FIGS. 6a–6d, the valve 122 may include a retaining ring 43 attached to the valve stem 142 that prevents the valve 122 from escaping the valve seat 24 as the retaining ring abuts a shoulder 25 of the valve seat 24. So configured, the range of motion of the—now floating—valve 122 will vary depending on whether the driver 34 is adjusted to permit or prevent contact between the valve head 140 and the valve seat 24 before there is contact between the valve stem 142 and the driver 34 occurs. If the driver 34 is adjusted to permit contact between the valve head 140 and the valve seat 24 before there is contact between the valve stem 142 and the driver 34 (a restrictive position because fluid flow is still permitted through orifice 48), the range of motion of the valve 122 is limited on one side by contact between the retaining ring 43 and the valve seat shoulder 25, and on the other side by contact between the valve head 140 and the valve seat 24. If the driver 34 is adjusted to prevent contact between the valve head 140 and the valve seat 24 before there is contact between the valve stem 142 and the driver 34 (a less restrictive position because fluid flow is permitted between the valve 122 and the valve seat 24, as well as through orifice 48), the range of motion of the valve 22 is limited on one side by contact between the retaining ring 43 and the valve seat shoulder 25, and on the other side by contact between the valve stem 142 and the driver 34.

Figure 6A:
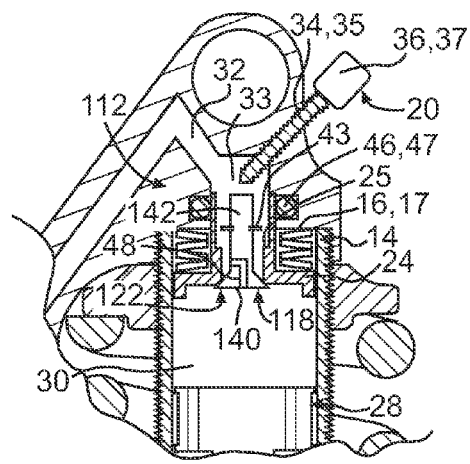
FIGS. 6a–6d are cross-sectional views of another embodiment of the present invention, showing in particular, a sequence of valve mechanism positions for a flow restrictive mechanism system excluding a valve spring.
Figure 6B:
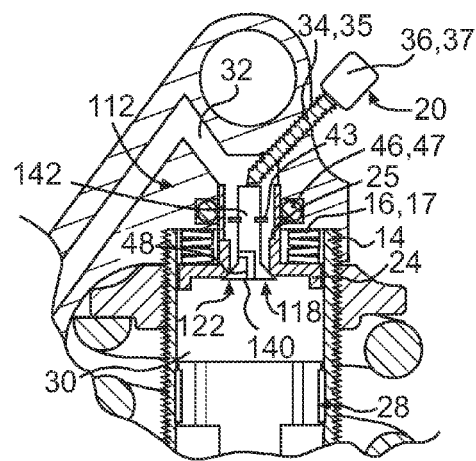
Figure 6C:
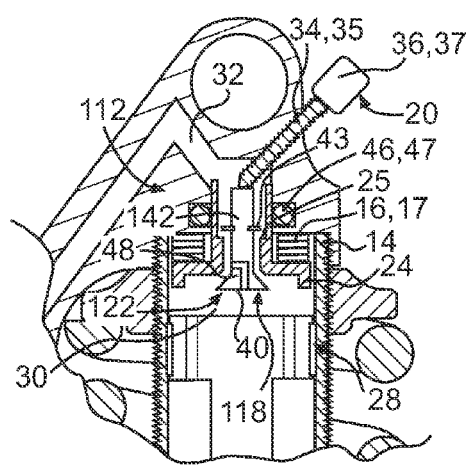
Figure 6D:
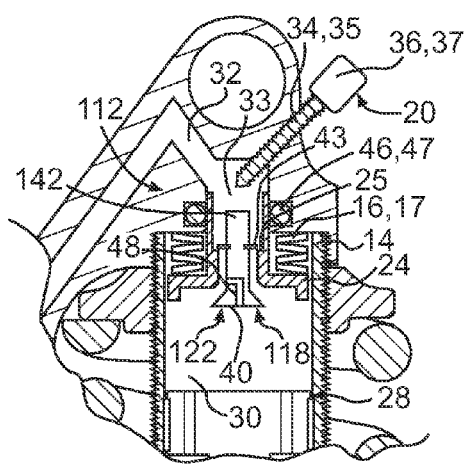

Looking to the FIGS. 6a–6d, an operating sequence of the flow-restrictive mechanism 112 will be described with the driver 34 adjusted to permit contact between the valve head 140 and the valve seat 24, before there is contact between the valve stem 142 and the driver 34. Under increasing pressure in the first fluid chamber 30 caused by deflection of the piston 28 toward the valve mechanism 18, the floating valve 122 will be biased toward the valve seat 24, the valve head 140 engaging the valve seat 24 before the resilient member 16 is compressed (FIG. 6a). So positioned although in a restrictive position—fluid flow is still permitted between the first and second chambers 30, 32 through orifice 48. Under increasing pressure in the first fluid chamber 30 despite the presence of open orifice 48—the valve 122 will continue to engage the valve seat 24 as the resilient member 16 is partially compressed by the deflection of valve mechanism 118 toward the driver 34 with contact resulting between the valve stem 142 and the driver 34 (FIG. 6b). This will prevent further deflection of the valve 122 but not the valve seat 24. With continued deflection of the valve seat 24, the resilient member 16 is further compressed until the contact between the valve head 140 and the valve seat 24 is cracked open to relieve the mounting pressure in the first fluid chamber 30 by permitting additional fluid flow from the first fluid chamber 30 into the second fluid chamber 32 (FIG. 6c). On the return stroke of the piston 28, i.e. motion of the piston 28 away from the valve mechanism 118, the resilient member 16 returns to its uncompressed state, and the valve 122 is displaced away from the valve seat 24 by the return flow of fluid from the second chamber 32 into the first chamber 30.

Figure 7:
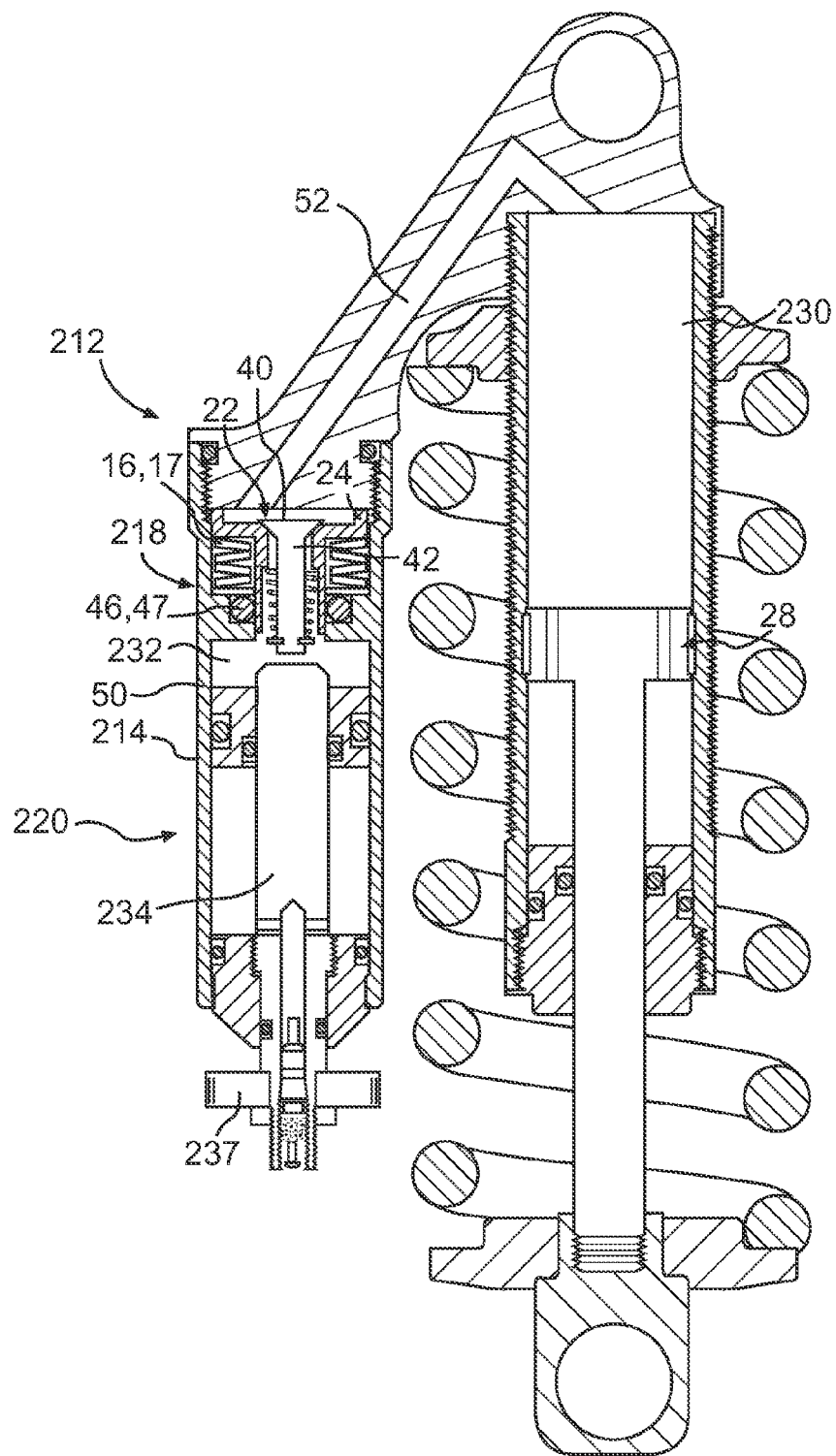
FIG. 7 is a cross-sectional view of another embodiment of the present invention, showing in particular, the valve mechanism housed in a reservoir tank in fluid communication with the piston tube.

FIG. 7 shows a further embodiment of the present invention wherein a lockout mechanism 212 comprising a valve mechanism 218 and a valve actuating assembly 220 is disposed in a reservoir tube 50 in fluid communication with the piston tube 26 through a duct 52. In this embodiment, a valve mechanism housing 214 comprises a portion of the reservoir tube 50. The valve actuating assembly 220 comprises a driver 234 operatively connected an actuator knob 237, the driver 234 displaceable relative to the valve mechanism housing 214 by rotation of the knob 237. The valve mechanism 218 is slidably mounted along the valve mechanism housing 214, separating a first fluid chamber 230 from a second fluid chamber 232 and controlling fluid flow therebetween. The operation of the lockout mechanism 212 shown in FIG. 7 is similar to that of the system of FIGS. 1–3, but it will be understood that the reservoir tube system shown in FIG. 7 can also be adapted to include the lockout and flow-restrictive mechanisms shown in FIGS. 4–6.

Figure 8:
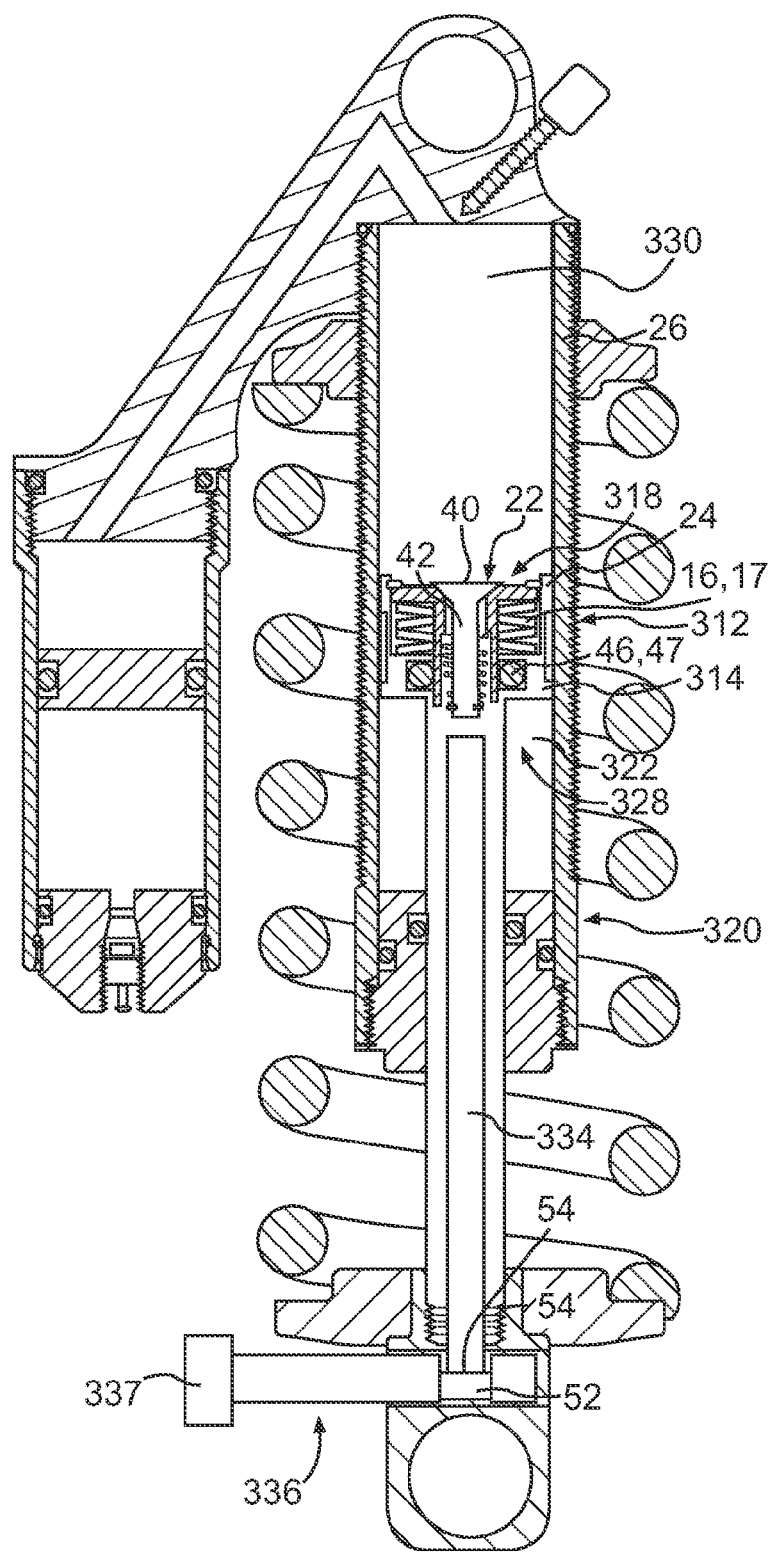
FIG. 8 is a cross-sectional view of another embodiment of the present invention, showing in particular, the valve mechanism housed in the piston assembly.

FIG. 8 is a further embodiment of the present invention wherein a lockout mechanism 312 comprising a valve mechanism 318 and a valve actuating assembly 320 is associated with and displaceable with a piston assembly 328. In this embodiment, a valve mechanism housing 314 comprises a portion of the piston assembly 328. The valve actuating assembly 320 comprises a driver 334 operatively connected to an actuator 337, the driver 334 displaceable relative to the valve mechanism housing 314 by rotation of a user-adjustable knob 337. The valve mechanism 318 is slidably mounted along the valve mechanism housing 314, separating a first fluid chamber 330 from a second fluid chamber 332 and controlling fluid flow therebetween. The actuator 336 further includes a cam 52 configured to operatively engage a follower 54 on the driver 334. Rotation of the actuator 336 will rotate the cam 52 causing it to impart a displacement to the driver 334 through the follower 54. The operation of the lockout mechanism 312 shown in FIG. 8 is similar to that of the system of FIGS. 1–3, but it will be understood that the piston assembly system 328 shown in FIG. 8 can also be adapted to include the lockout and flow-restrictive mechanisms shown in FIGS. 4–6.

Figure 9A:
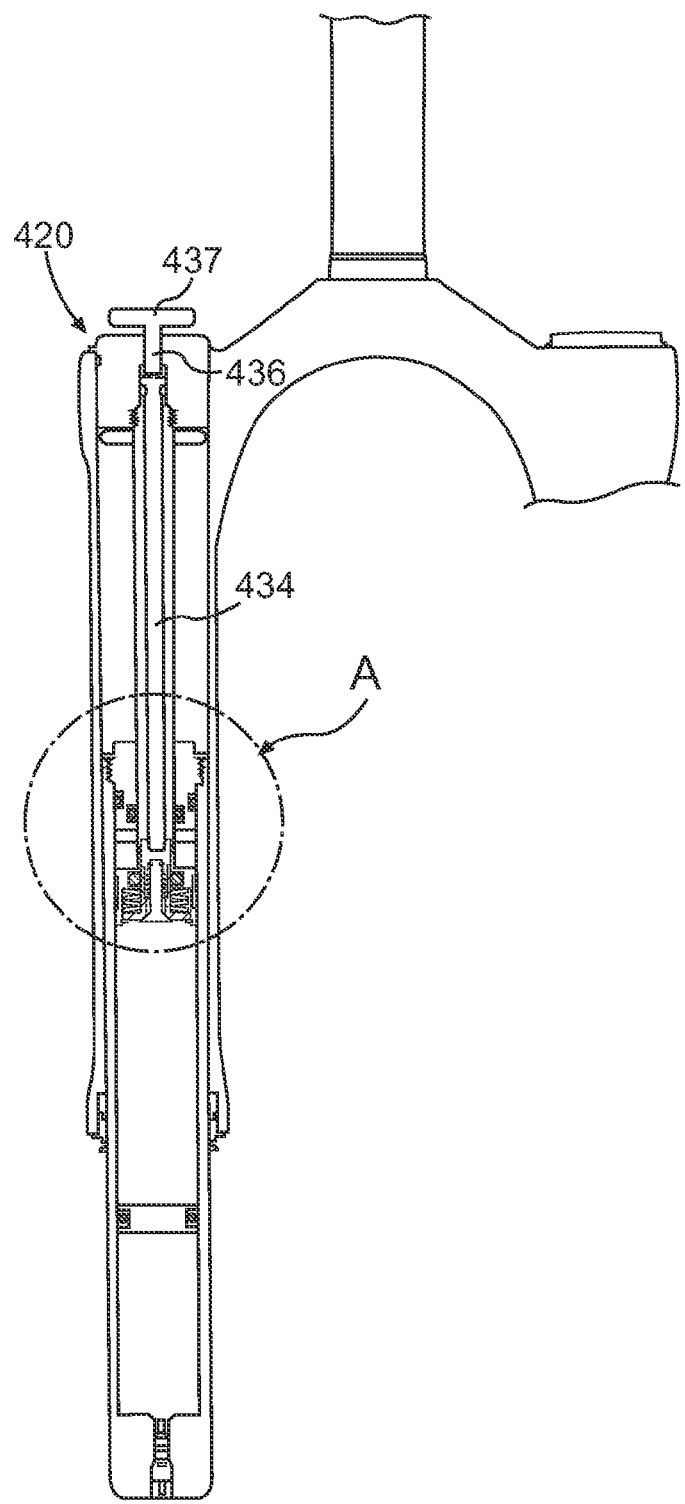
Figure 9B:
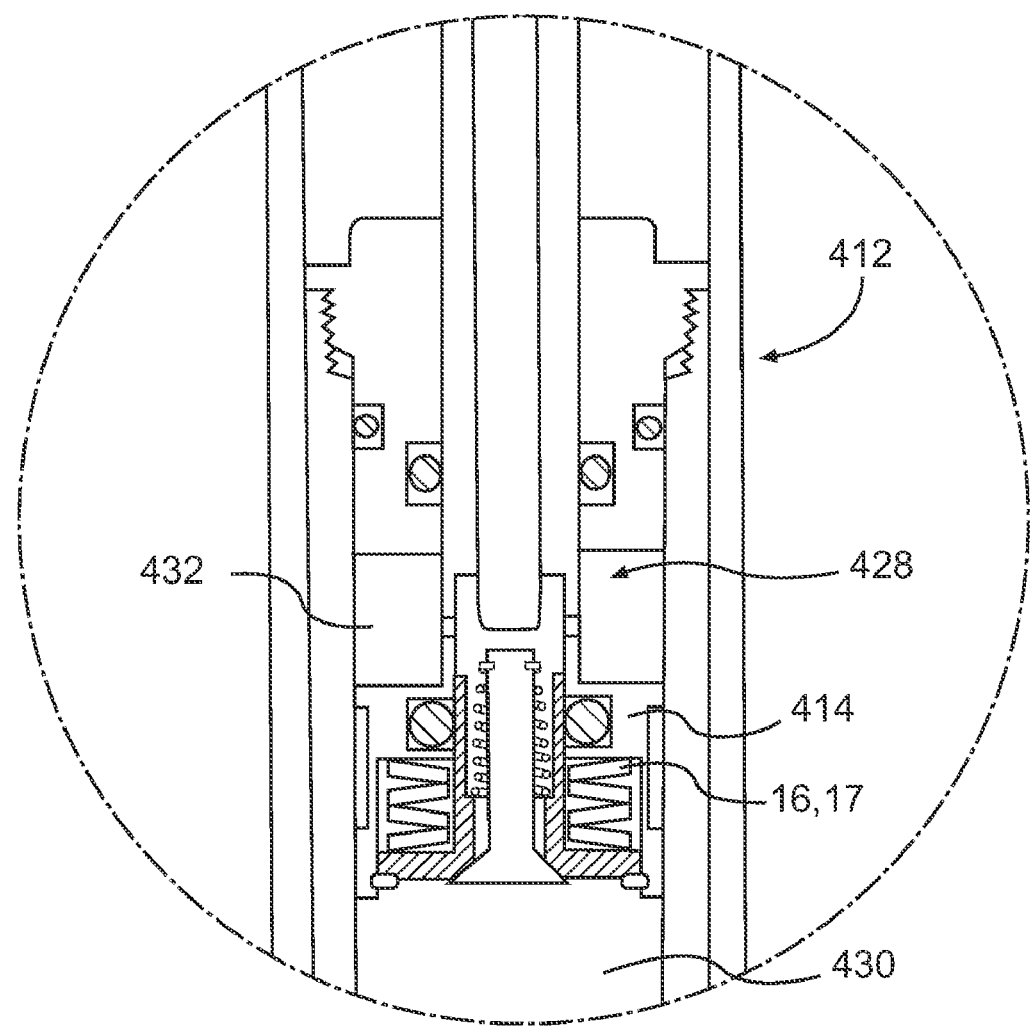

FIGS. 9a 9b depict another embodiment of the present invention, similar to the embodiment of FIG. 8, showing in particular, a lockout mechanism 412, comprising a valve mechanism 418 and valve actuating assembly 420, housed in a piston assembly 428 of one leg of a front suspension fork. FIG. 9b shows a blow-up of detail A of FIG. 9a. In this embodiment, the valve actuating assembly 420 comprises a driver 434 operatively connected to an actuator 436, the driver 434 displaceable relative to a valve mechanism housing 414 by rotation of a user-adjustable knob 437. The valve mechanism 418 is slidably mounted along the valve mechanism housing 414, separating a first fluid chamber 430 from a second fluid chamber 432 and controlling fluid flow therebetween. The operation of the lockout mechanism 412 shown in FIGS. 9a–9b is similar to that of the system of FIGS. 1–3, but it will be understood that the piston assembly system shown in FIG. 9 can also be adapted to include the lockout and flow-restrictive mechanisms shown in FIGS. 4–6.

Figure 10:
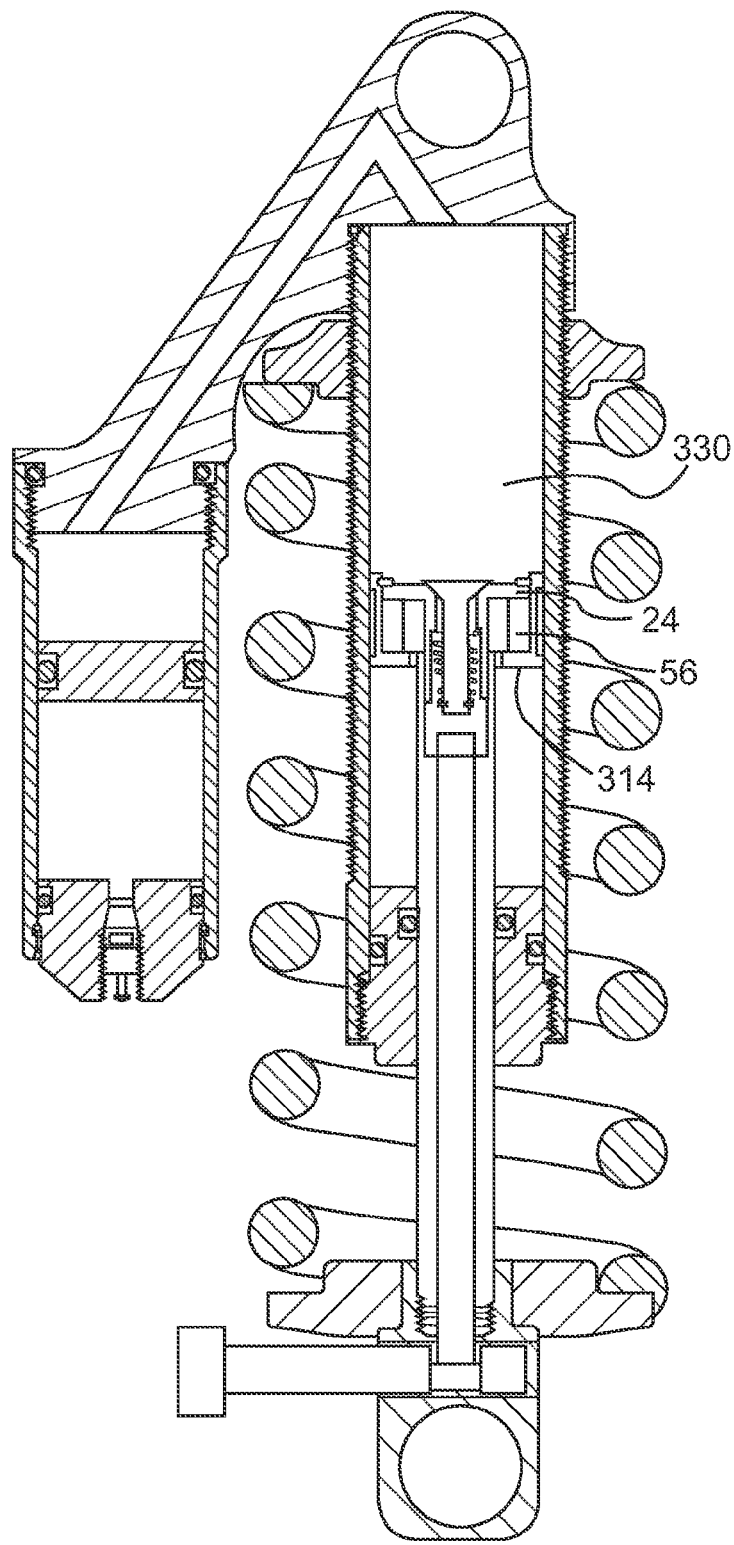
FIG. 10 is a cross-sectional view of another embodiment of the present invention, similar to the embodiment of FIG. 8, showing in particular, a resilient member formed integrally with the seal.
Figure 12:
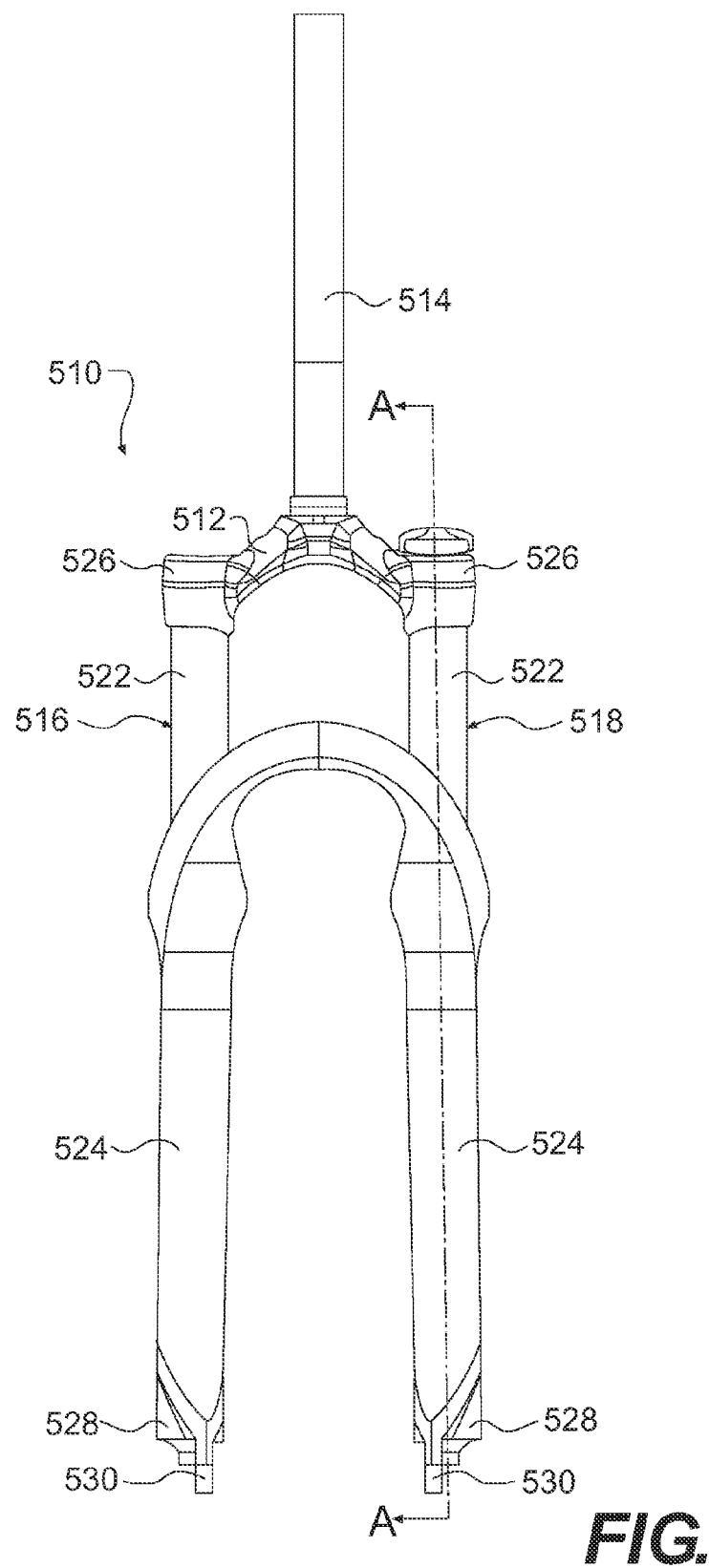
FIG. 12 is a front view of a bicycle suspension fork in accordance with another embodiment of the present invention.

FIG. 10 depicts another embodiment of the present invention, similar to the embodiment of FIG. 8, showing in particular, a resilient member 56 formed integrally with the seal 46. The resilient member 56 is configured to both deform in response to displacement of the valve seat 24 under increasing pressure in the first fluid chamber 330, as well as provide a seal between the valve seat 24 and the valve mechanism housing 314.

FIGS. 11a 11b depict yet another embodiment of the present invention, similar to the embodiment of FIGS. 1–3, showing in particular, a resilient valve seat 58 formed integrally with the resilient member 16 and the seal 46 of the embodiment of FIGS. 1–3. The resilient valve seat 58 is configured to both deform in response to increasing pressure in the first fluid chamber 30, as well as provide a seal between the valve 22 and the valve mechanism housing 14. FIG. 11a shows the system in an operating position comparable to FIG. 3a, with the valve 22 seated against the valve seat 58 to prevent fluid flow between the first and second fluid chambers 30, 32. FIG. 11b shows the system in a blow-off position comparable to FIG. 3c, with the resilient valve seat 58 deflecting to permit fluid flow between the first and second fluid chambers 30, 32 after the valve 22 collides with the driver 34.

FIGS. 12–18 illustrate a front suspension system in accordance with another embodiment of the present invention. The suspension system depicted is a bicycle front suspension fork 510 having a crown 512 that is connected to a steerer tube 514, a first leg 516 that may contain a biasing mechanism or spring assembly, and a second leg 518 that contains a damping mechanism 520. Each of the legs 516, 518 include an upper tube 522 and a lower tube 524. Although the upper tubes 522 are shown as inner tubes slidable within the lower outer tubes 524, it will be appreciated that the lower tubes may alternatively be reconfigured as inner tubes slidable within reconfigured outer tubes. Additionally, although the tubes 522, 524 are shown to have substantially circular cross sections, it is understood that they may assume any cross-sectional shape. The inner and outer tubes 522, 524 are connected at their remote ends 526, 528 to the crown 512, and a wheel axle (not shown) through a dropouts 530, respectively.

Figure 13:
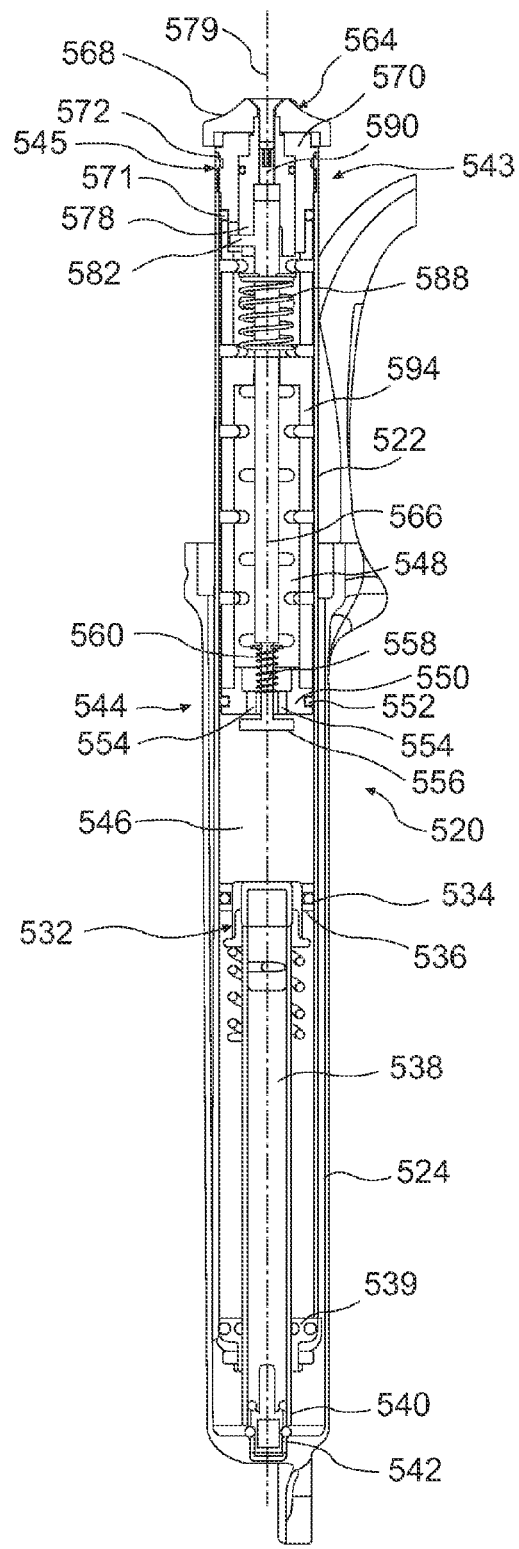
FIG. 13 is a cross-sectional view taken along line A—A of a leg of the suspension fork of FIG. 12 containing the damping mechanism.

In FIG. 13, the damping mechanism 520 includes a compression piston assembly 532 that slides within the inner tube 522 during compression and expansion of the suspension and orifices 554 through which fluid is forced to dampen or slow down the speed of the fork 510 in response to an applied load. Piston assembly 532 includes a piston 534 that is attached at a lower end 536 to a piston rod 538. Rod 538 extends through a bottom portion of the inner tube 522 and has a bottom end 540 that is non-rotatably mounted to the outer tube 524 by a screw 542. Inner tube 522 is restricted from pulling out of the lower tube 524, when the fork 510 is fully extended, by an end cap 539 attached to piston rod 538.

The suspension fork 510 includes a lockout mechanism 543 for switching the fork 510 between being a substantially rigid fork and a substantially compressible fork. The lockout mechanism 543 includes a valve mechanism 544 and a valve actuating assembly 545. The valve mechanism 544 is located in a valve mechanism housing or the inner tube 522 and divides the inner tube 522 into first and second fluid chambers 546, 548. The valve mechanism 544 includes a valve 556 and a valve seat 550 slidably mounted in the inner tube 522. The orifices 554 extend through the valve seat 550 to allow fluid to flow between the first and second chambers 546, 548. The valve 556 includes a valve stem 558 that extends through the valve seat 550 into the second fluid chamber 548. The valve 556 is biased toward a closed position by a valve spring 560. An O-ring 552 surrounds the valve seat 550 to provide a seal between the valve seat 550 and the inner tube 522 to prevent fluids from passing between the first and second fluid chambers 546, 548 along the inner tube 522 wall.

Figure 14:
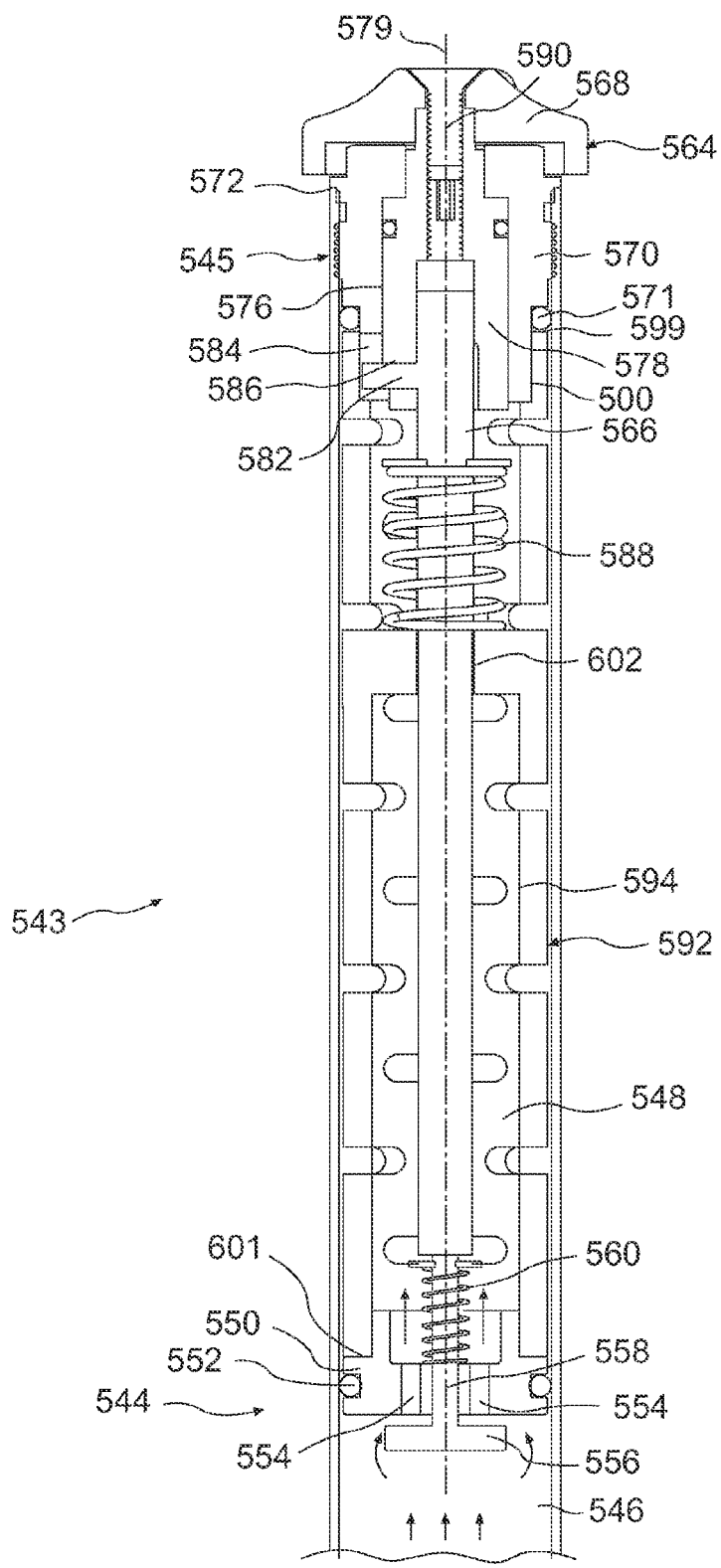
FIG. 14 is a partial cross-sectional view of the suspension fork of FIG. 13 showing a valve mechanism in an open position.
Figure 15:
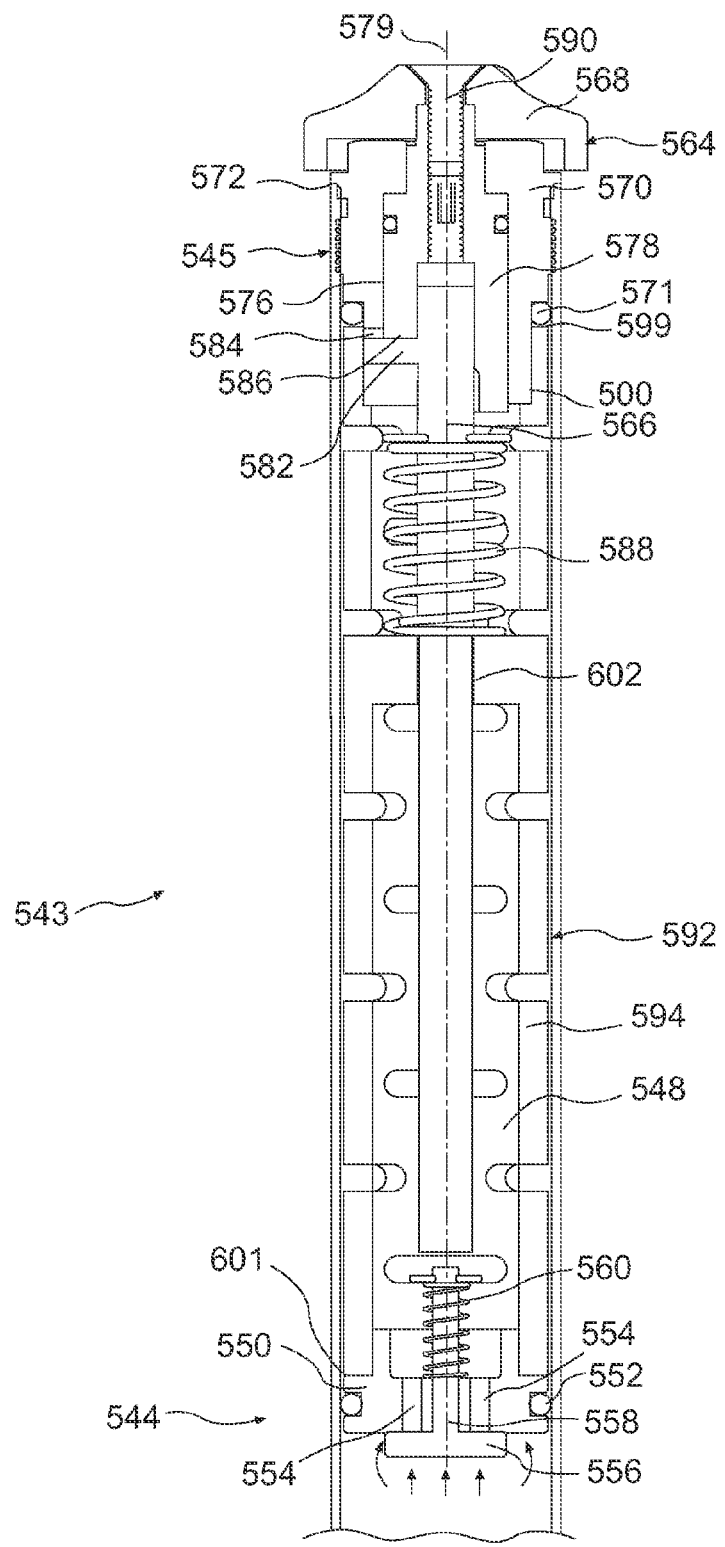
FIG. 15 is a partial cross-sectional view of the suspension fork of FIG. 13 showing the valve mechanism in a closed position.

The valve 556 is operable between an open position which opens the orifices 554 allowing fluid to flow between the chambers 546, 548 (see FIG. 14), and the closed position which closes the orifices 554 preventing fluid flow between the chambers 546, 548 (see FIG. 15). Under compression, fluid flows through the orifices 554 in a first direction from the first fluid chamber 546 to the second fluid chamber 548. Under expansion, fluid returns through the same orifices 554 to the first fluid chamber 546.

The valve actuating assembly 545 operates the valve 556 between open and closed positions and generally includes an actuator 564 and a driver 566. The actuator 564 may include a knob 568 that extends beyond an outer end 572 of the inner tube 522. A top cap 570 is rigidly connected to the inner tube 522 and has a seal 571 that prevents the fluids from escaping through the outer end 572 of inner tube 522. The top cap 570 has a cavity 576 for receiving a cam 578 that is rotationally fixed to the knob 568 and rotates about an axis 579 with the knob 568, but is axially constrained by the setscrew 590 and the inner surface of the top cap 570. The cam 578 is operatively connected to the driver 566 through a pin 582 extending from the driver 566 such that as the knob 568 is turned the cam 578 rotates and contacts the pin 582 of the driver 566. The rotation of the cam 578 drives the driver 566 up and down depending on the direction of rotation to engage or disengage the valve stem 558. The driver 566 is free to move along the axis 579 but is held rotationally fixed by a slot 584 in the top cap 570. The cam 578 can only be rotated a certain amount before it drives the pin 582 of the driver 566 into a vertical stop 586 at each end of the cam 578.

A return spring 588 biases the driver 566 upward into the cam 578. The setscrew 590 limits the amount the driver 566 may extend into the cam 578. The amount that the driver 566 extends into the cam 578 may be adjusted by adjusting the setscrew 590 further in or out of the cam 578. So configured, as the cam 578 is rotated, the driver 566 rises under the force of the return spring 588 and follows the surface of the cam 578 until it hits the setscrew 590. The setscrew 590 limits the return stroke of the rod 566 regardless of how much the cam 578 is rotated.

As shown in FIG. 14, the lockout mechanism 562 includes a blow-off mechanism 592 that is provided to allow the fork 510 to blow-off or compress under high compression forces when the lockout mechanism 562 is on. The blow-off mechanism 592 may include a resilient member or spring tube 594 located between the top cap 570 and the valve seat 550. At one end 599 of the spring tube 594 is a counterbore 600 that limits the engagement between the top cap 570 and the spring tube 594. End 601 of the spring tube 594 is connected to the valve seat 550. The spring tube 594 has a hole 602 extending through its center for receiving the driver 566. The hole 602 acts as a guide for the driver 566 while it displaces along the axis.

Figure 16:
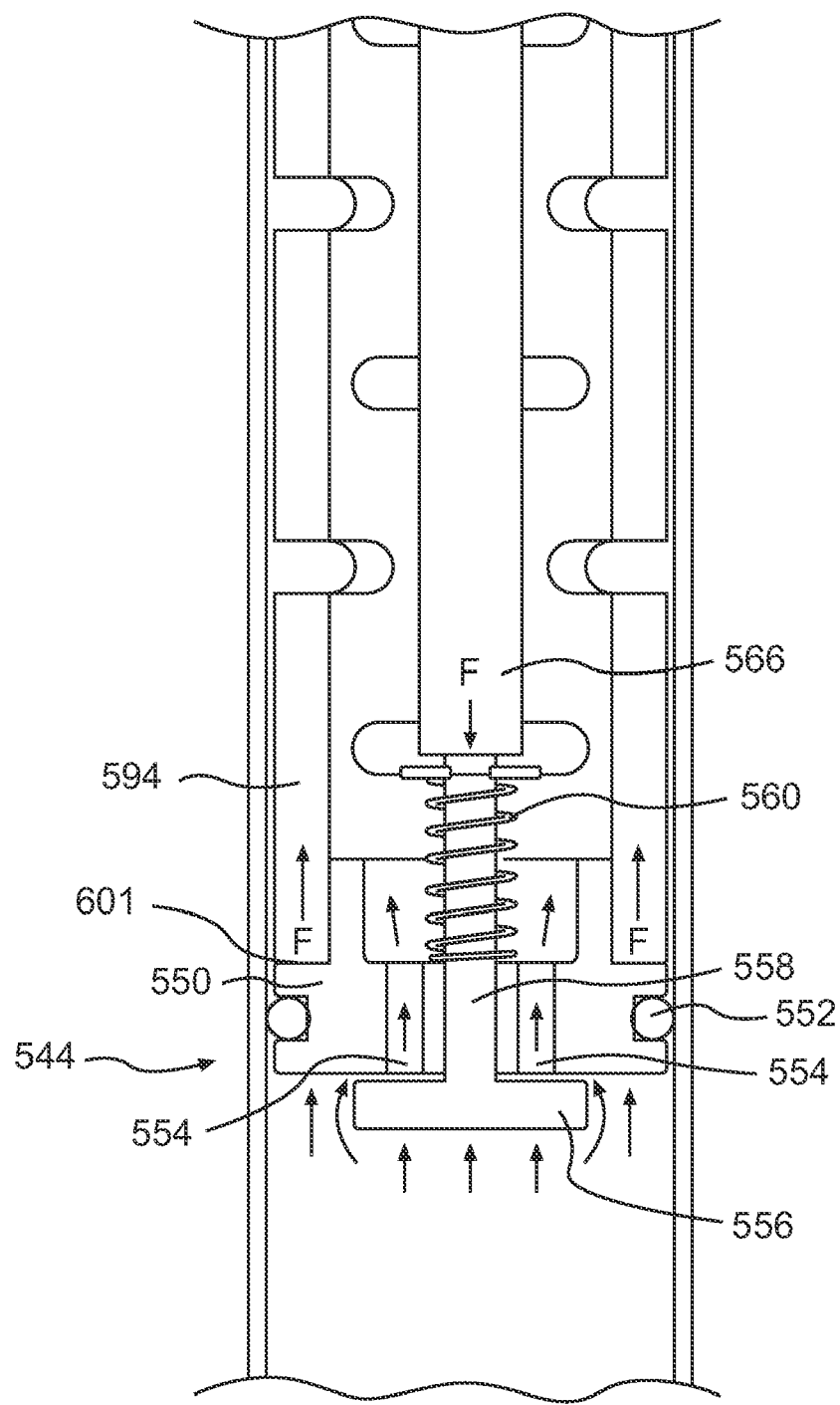
FIG. 16 is a partial cross-sectional view of the suspension fork of FIG. 13 showing a spring tube being compressed under a high compression load.

So configured, when a large compressive force is applied to the suspension, with the lockout mechanism 562 on, the piston 534 forces the fluid against the valve 556 and valve seat 550. Referring to FIG. 16, as the pressure of the fluid against the valve seat 550 increases, the valve seat 550 starts to displace axially causing the spring tube 594 to compress. As the compressive force applied to the fork 510 increases, the valve seat 550 will slide toward the driver 566 until the valve stem 558 collides or engages the driver 566. The valve 556 is now restricted from moving further upward by the driver 566. If the compressive force is strong enough, the valve seat 550 will continue to move away from the valve 556, resulting in the valve 556 being cracked open, permitting fluid to flow through orifices 554 in the valve seat 550. The cracking open of the valve 556 at high pressures is called "blow-off." This limits the maximum force on the spring tube 594 and other parts of the assembly. During the return stroke, the compression piston assembly 532 reverses direction and any fluid which passed through the orifices 554 during blow-off, easily returns through the orifices 554, piston assembly 532 creating a vacuum drawing the valve 556 away from valve seat 550 against the force of valve spring 560.

A gap between the valve stem 558 and the driver 566, and the spring rate of the spring tube 594 determines the pressure at which the valve 556 blows off (see FIG. 15). For example, if the valve spring rate was 50 pounds/in and the spring tube 594 was 100 pounds/in, and the distance between the driver 566 and the valve stem 558 is 0.5 inches, then the spring rate of the fork 510 in locked out mode is 50 pounds/in+100 pounds/in=150 pounds/in. And the force at which the locked out fork 510 blows off is (0.5 in) (50 pounds/in+100 pounds/in)=75 pounds.

Figure 17:
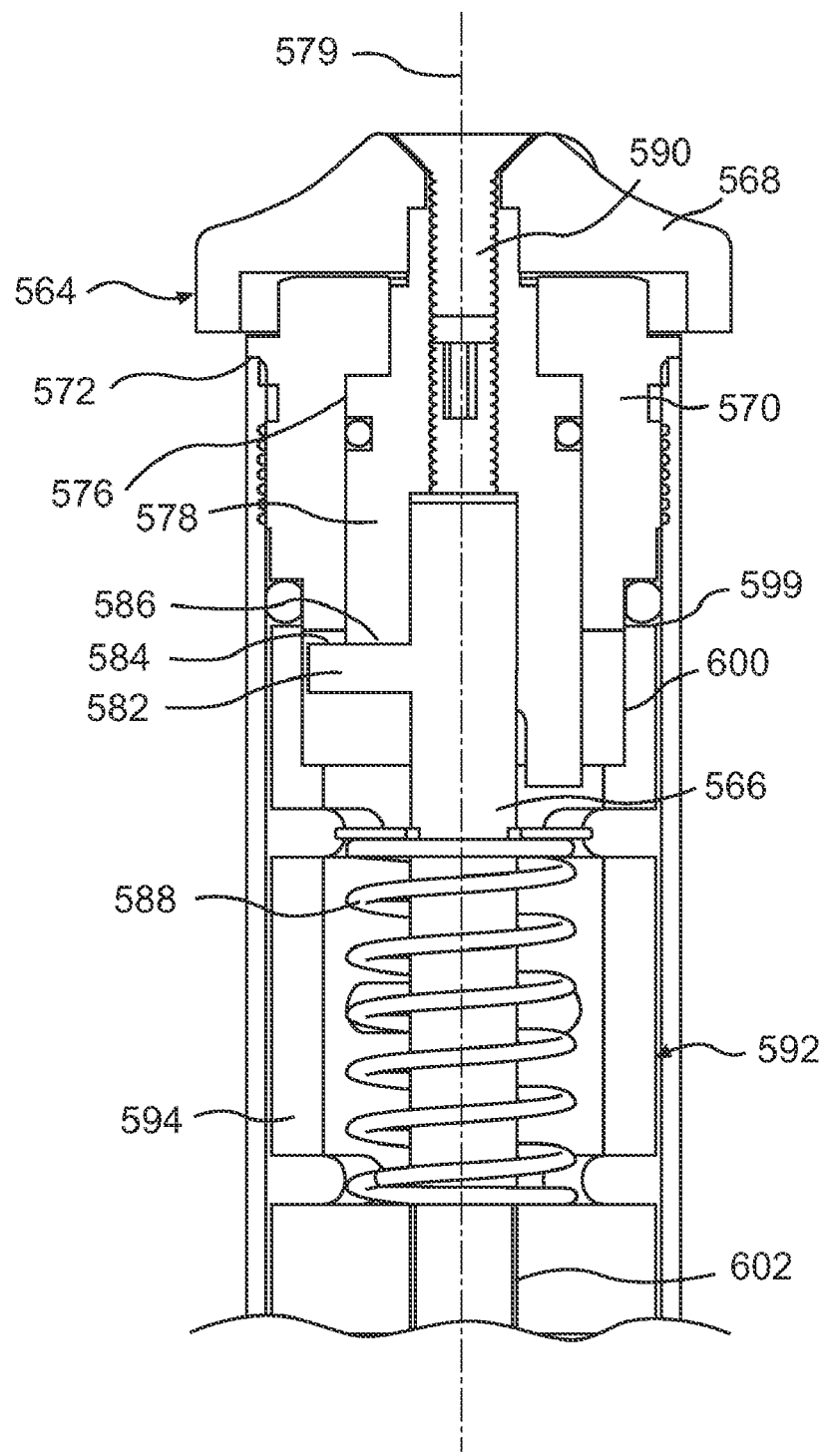
FIG. 17 is a partial cross-sectional view of the suspension fork of FIG. 13 showing an driver fully extended into a cam.

The length of the gap between the valve stem 558 and the driver 566 is determined by either selecting a particular position of the cam 578 or adjusting the setscrew 590. The driver 566 is biased away from the valve stem 558 and into the cam 578 by the return spring 588. How far the driver 566 extends into the cam 578 is determined by the cam surface. FIG. 17 shows a maximum distance the driver 566 may extend into the cam 578. The cam 578 may have a contoured surface where the driver 566 engages the cam 578, providing various gaps between the driver 566 from the valve stem 558. This results in different "blow-off" forces for each position.

Figure 18:
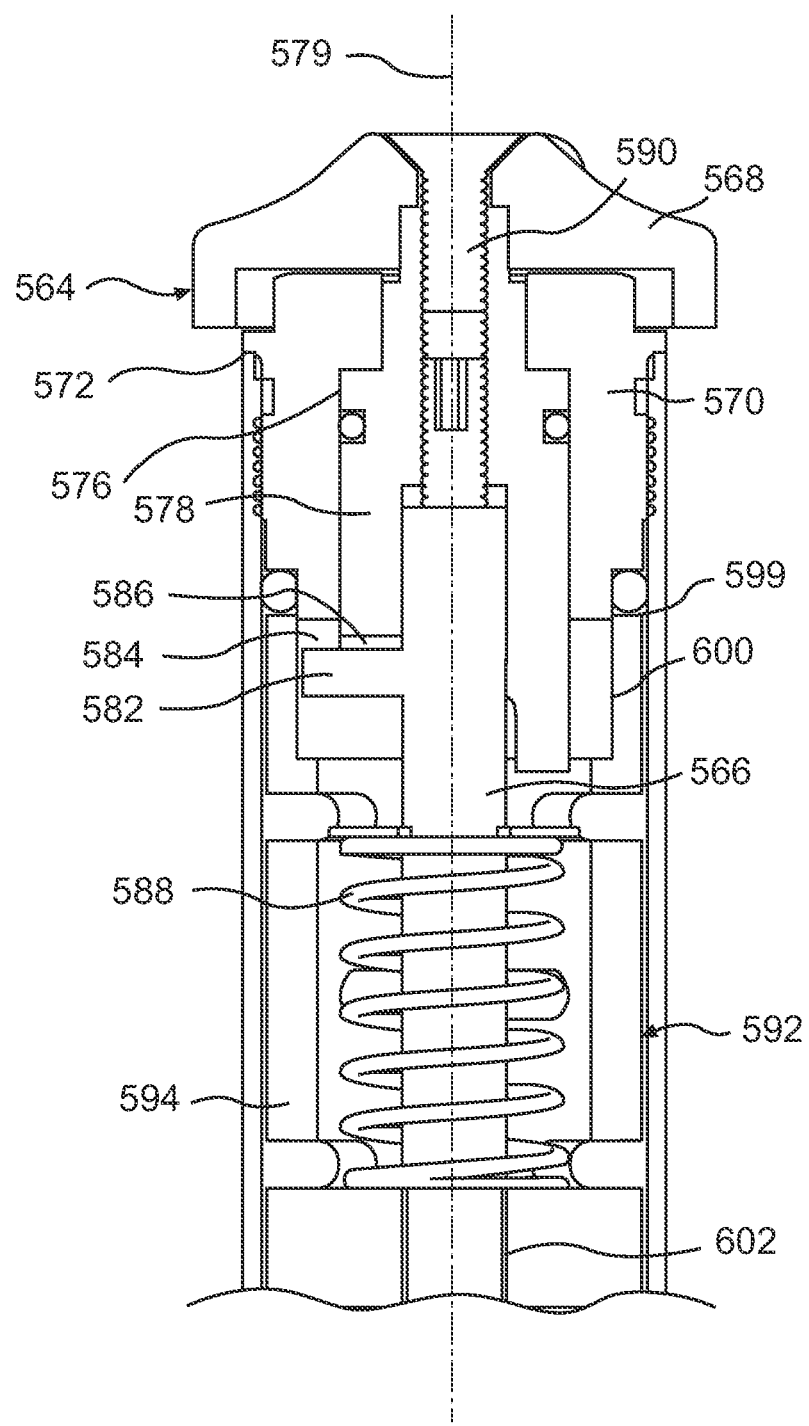
FIG. 18 is a partial cross-sectional view of the suspension fork of FIG. 13 showing an driver partially extended into the cam.
Figure 19:
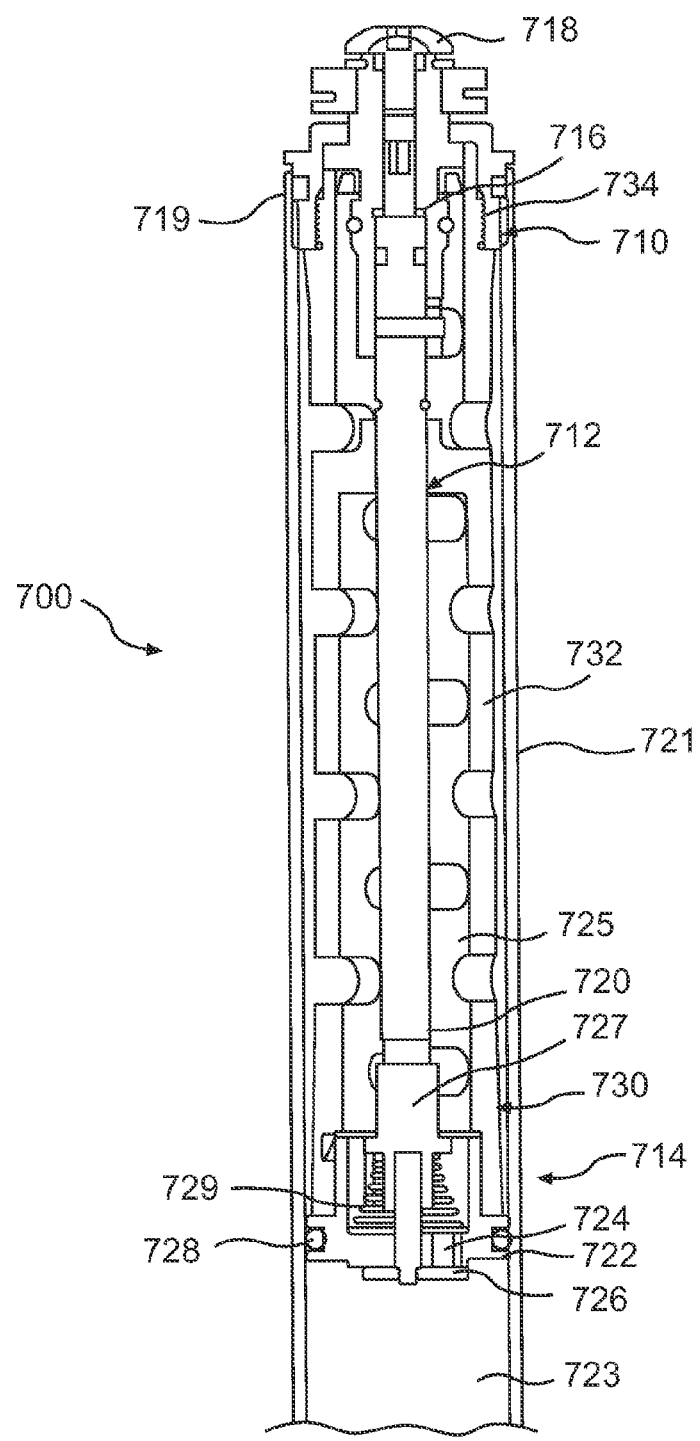
FIG. 19 is a partial cross-sectional view of a lockout mechanism according to another embodiment of the present invention.

FIG. 18 illustrates how the gap between the driver 566 and the valve stem 558 may be adjusted by the setscrew 590. The setscrew 590, located in the cam 578, restricts the upward movement of the driver 566 into the cam 578 when the lockout mechanism 562 is on. When the lockout mechanism 562 is off, the driver 566 is held down by the cam 578, but when the cam 578 is rotated to turn on the lockout mechanism 562, the driver pin 582 comes off the cam surface and rides on the setscrew 590. So configured, the rider can operate the lockout mechanism 562 between the on and off positions without adjusting the blow-off force. The blow-off mechanism 592 may be adjustable through a separate knob or the setscrew 590.

In operation, the lockout mechanism 562 is turned off when the rider wants the fork 510 to absorb an applied load. The rider rotates the knob 568 to an "off" position. As the knob 568 is rotated, the cam 578 is rotated in a first direction, which drives the driver 566 toward the valve stem 558. Eventually, the driver 566 engages the valve stem 558 and moves the valve 556 to an open position. When the valve 556 is open, the fluid is free to flow between the first and second fluid chambers 546, 548 through all the orifices 554 when the compression piston 534 is compressed during a load. The fluid may also return to the first chamber 546 through all the orifices 554 when the suspension returns to its expanded position.

When the rider wants the fork 510 to be rigid, the lockout mechanism 562 is turned on. The knob 568 is turned to the "on" position and the cam 578 is rotated in a second direction opposite the first direction. As the cam 578 rotates in second direction, the return spring 588 pushes the driver 566 up and away from the valve stem 558. When the valve 556 is closed, the fluid is prevented from flowing between the first and second fluid chambers 546, 548. If the fluid cannot flow then the compression piston 534 cannot move and the shock is essentially locked out. The knob 568 may be rotated to a desired setting by the rider while the bicycle is stationary or in motion permitting quick adjustments "on the fly." When a high compression force is applied to the fork 510 during the lockout mode, the spring tube 594 will compress, and valve seat 550 and valve 556 will displace away from piston 534 until the valve stem 558 engages the adjustment rod 566. If the compressive force is strong enough, the spring tube 594 and the valve seat 550 will continue to compress lifting valve 556 off valve seat 550 and allowing fluid to flow into the second fluid chamber 548 through all the orifices 554. By cracking open the valve 556, the maximum force on the spring tube 594 and other parts of the assembly is limited.

In another embodiment shown in FIGS. 19–23, a lockout mechanism 700 includes a valve actuating assembly 710 that has an driver 712 that is rotated rather than axially displaced to open and close a valve mechanism 714. The driver 712 has a first end 716 rotatably connected to a knob 718 located at the end 719 of the inner tube 721 and a second end 720 rotatably connected to the valve mechanism 714. The valve mechanism 714 includes a valve 726 and a valve seat 722 that is slidably mounted in the valve mechanism housing or the inner tube 721 and divides the inner tube 721 into first and second fluid chambers 723, 725. Orifices 724 extend through the valve seat 722 to allow fluid flow between the chambers 723, 725. The valve 726 is operable between an open position, which opens the orifices 724 allowing fluid to flow between the chambers 723, 725 and a closed position, which closes the orifices 724 preventing fluid flow between the chambers 723, 725. The valve 726 is biased toward the closed position by a valve spring 729. An O-ring 728 surrounds the valve seat 722 to provide a seal between the first and second fluid chambers 723, 725. The valve 726 includes a valve stem 727 that extends through the valve seat 722 into the second fluid chamber 725. An end 736 of the valve stem 727 is received in a slot 738 of the driver 712 such that the end 736 is slidable within the slot 738 and upon rotation of the driver 712 the valve 726 rotates to open or close the orifices 724 depending on the direction of rotation.

Figure 20:
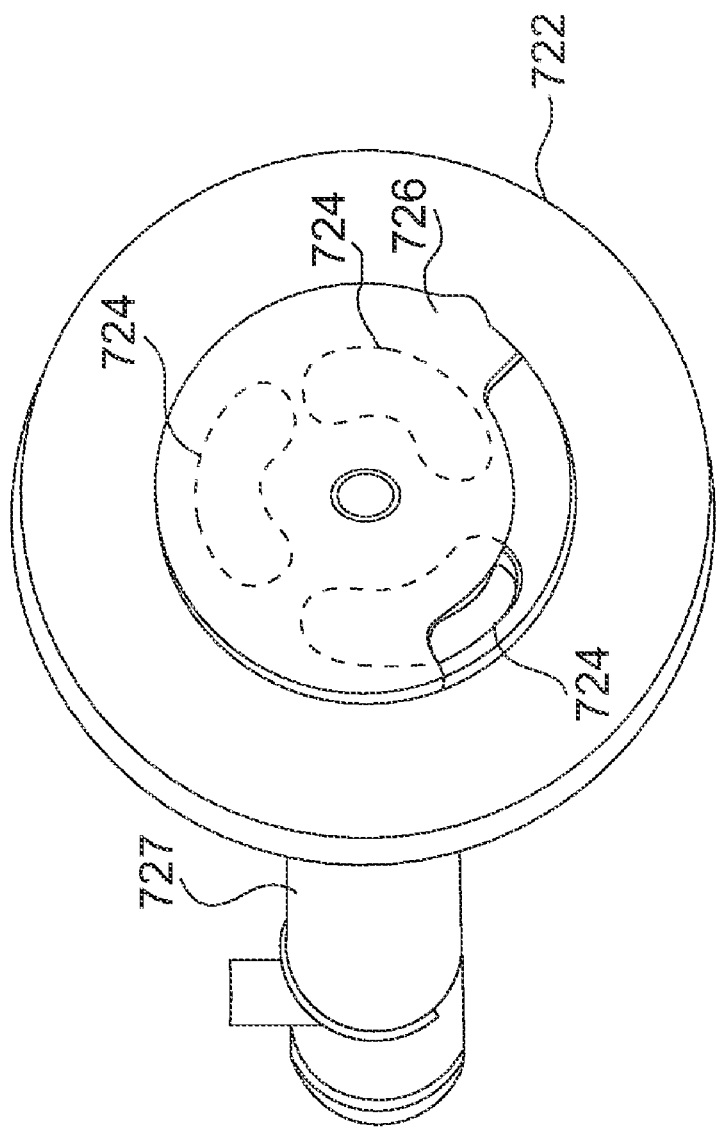
FIG. 20 is a perspective view of a valve mechanism of the lockout mechanism of FIG. 19 showing the valve mechanism in an open position.
Figure 23:
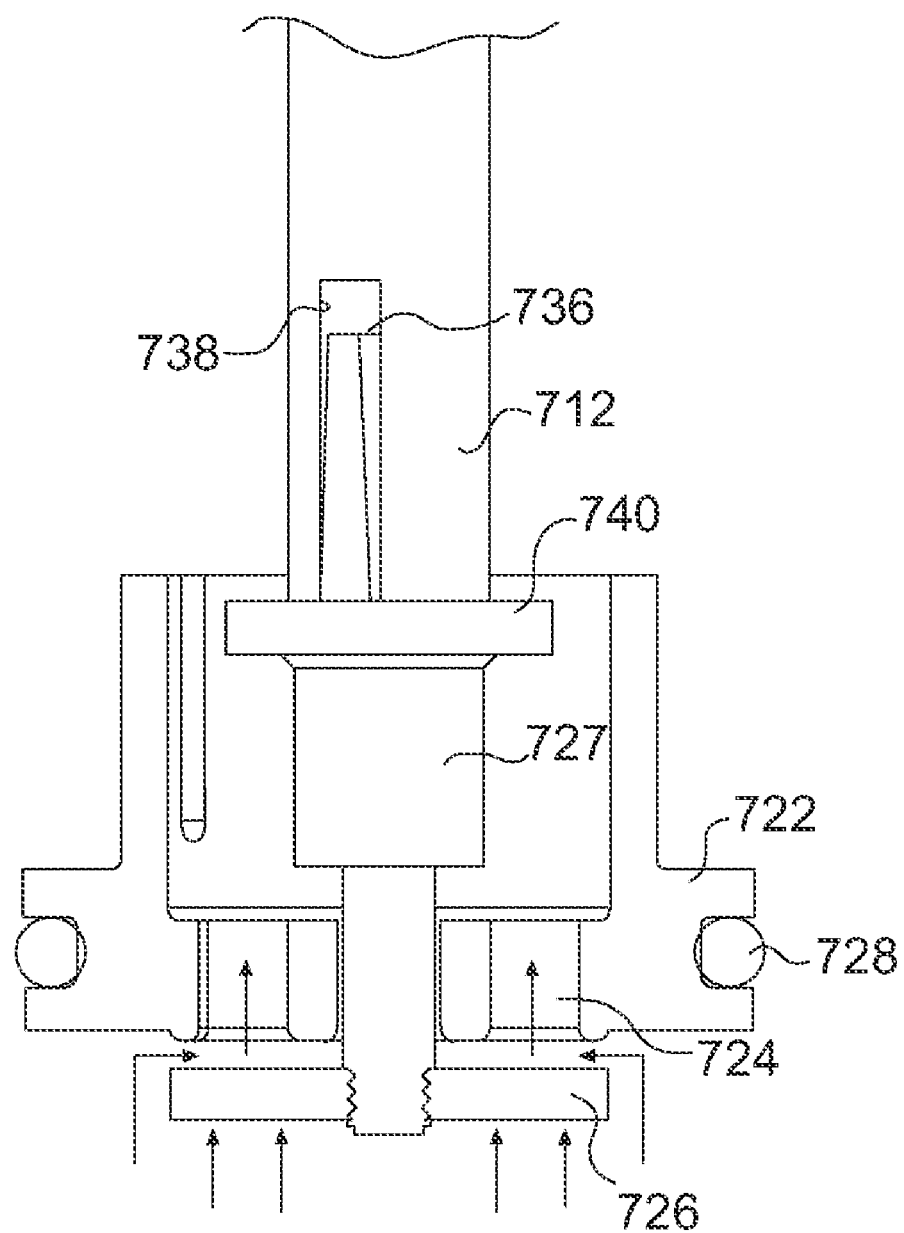
FIG. 23 is a partial cross-sectional view of the lockout mechanism of FIG. 19 showing the valve mechanism during blow-off.

When the lockout mechanism 700 is turned off, the driver 712 may be rotated until only one orifice 724 is partially opened to provide damping during the compression stroke, see FIGS. 20 and 21. However, during the return stroke the valve 726 is pushed downward, resulting in all the orifices 724 being opened to allow the fluid to return to the first chamber 723, see FIG. 22. The lockout mechanism 700 of this embodiment also includes a blow-off mechanism 730 similarly to one shown in FIGS. 12–18. The blow-off mechanism 730 includes a spring tube 732 located between a top cap 734 and the valve seat 722 such that when a large compressive force is applied to the lockout fork, the piston forces the fluid against the valve 726 and valve seat 722. As the fluid pressure against the valve seat 722 increases, the valve seat 722, the valve 726 and the valve stem 727 start to displace axially causing the spring tube 732 to compress. As the compressive forces increase, the valve seat 722, the valve 726 and the valve stem 727 will slide toward the driver 712 until a lip 740 of the valve stem 727 collides with the driver 712, see FIG. 23. If the compressive force is strong enough, the valve seat 722 will continue to move away from the valve 726, resulting in the valve 726 being cracked open, permitting fluid to flow through all the orifices 724 in the valve seat 722. During the return stroke, the compression piston assembly reverses directions and any fluid, which passed through the valve seat 722 during blow-off, easily returns through all the orifices 724 of the valve seat 722. A length X of a gap 742 between the lip 740 of the valve stem 727 and the driver 712, and the spring rate of the spring tube 732 determines the pressure at which the valve 726 blows off (see FIGS. 21 and 22).

While this invention has been described by reference to a preferred embodiment, it should be understood that numerous changes could be made within the spirit and scope of the inventive concepts described. For example, the bicycle suspension has been depicted as a suspension fork but it can take the form of a rear shock, a seat post, or any other type of suspension positioned along the bicycle frame. Accordingly, it is intended that the invention not be limited to the disclosed embodiment, but that it have the full scope permitted by the language of the following claims.

The invention claimed is:

1. A suspension system comprising:
   a lockout mechanism including a valve mechanism and a valve actuating assembly;
   a valve mechanism housing; and
   a resilient member disposed between the valve mechanism and the valve mechanism housing;
   the valve mechanism slidably mounted along the valve mechanism housing, the valve mechanism separating a first fluid chamber from a second fluid chamber and controlling fluid flow therebetween;
   the valve actuating assembly operably switching the valve mechanism between an open position in which fluid flow between the first and second fluid chambers is permitted and a closed position in which fluid flow between the first and second fluid chambers is blocked;
   the resilient member configured to be deformable by the valve mechanism as the valve mechanism is slidably displaced by an increasing pressure in the first fluid chamber, the increasing pressure biasing the valve mechanism toward the closed position, the sliding valve mechanism configured to collide against the valve actuating assembly when a blow-off pressure is reached in the first fluid chamber switching the valve mechanism from the closed position to the open position.

2. The suspension system of claim 1 wherein the valve mechanism further comprises:
   a valve seat slidably mounted along the valve mechanism housing; and
   a valve displaceable relative to the valve seat and positionable against the valve seat in the closed position, the valve switchable between the open and closed positions, the valve of the sliding valve mechanism configured to collide against the valve actuating assembly when the blow-off pressure is reached in the first fluid chamber.

3. The suspension system of claim 2 wherein the resilient member is disposed between the valve seat and the valve mechanism housing.

4. The suspension system of claim 3 wherein the valve seat and resilient member are formed integrally.

5. The suspension system of claim 2 further comprising a seal disposed between the valve mechanism and the valve mechanism housing.

6. The suspension system of claim 5 wherein the seal is disposed between the valve seat and the valve mechanism housing.

7. The suspension system of claim 2 further comprising a valve spring configured to bias the valve against the valve seat in the closed position.

8. The suspension system of claim 2 wherein the valve further comprises:
   a valve head;
   a valve stem; and a valve spring associated with the valve stem and configured to bias the valve head against the valve seat in the closed position;

the valve stem of the valve in the sliding valve mechanism configured to collide against the valve actuating assembly when the blow-off pressure is reached in the first fluid chamber.

9. The suspension system of claim 1 further comprising;
a first hollow tube; and
a compression piston assembly slidably mounted in the first hollow tube and displaceable relative thereto to increase the pressure in the first fluid chamber.

10. The suspension system of claim 9 wherein the valve mechanism housing forms a portion of the first hollow tube.

11. The suspension system of claim 9 wherein the valve mechanism housing forms a portion of the compression piston assembly.

12. The suspension system of claim 9 wherein the suspension system further comprises a second hollow tube in fluid communication with the first hollow tube, wherein the valve mechanism housing forms a portion of the second hollow tube.

13. The suspension system of claim 1 wherein the valve actuating assembly is operably mounted to and displaceable relative to the valve mechanism housing.

14. The suspension system of claim 13 wherein the valve actuating assembly further comprises:
a driver displaceable relative to the valve mechanism housing to operatively engage the valve mechanism; and
an actuator operatively connected to the driver.

15. The suspension system of claim 14 wherein the driver further includes a follower and the actuator further comprises:
a knob connected to the actuator and operable by a rider; and
a cam operatively engaging the follower.

16. The suspension system of claim 14 wherein the valve mechanism further comprises:
a valve seat slidably mounted along the valve mechanism housing; and
a valve displaceable relative to the valve seat and positionable against the valve seat in the closed position, the valve switchable between the open and closed positions, the valve of the sliding valve mechanism configured to collide against the driver when the blow-off pressure is reached in the first fluid chamber.

17. The suspension system of claim 16 wherein the valve includes a valve head and a valve stem configured to collide against the driver.

18. The suspension system of claim 16 wherein the resilient member is disposed between the valve seat and the valve mechanism housing.

19. The suspension system of claim 18 wherein the valve seat and resilient member are formed integrally.

20. The suspension system of claim 18 further comprising a seal disposed between the valve seat and the valve mechanism housing.

21. The suspension system of claim 20 wherein the resilient member and the seal are formed integrally.

22. The suspension system of claim 20 wherein the resilient member, the seal and the valve seat are formed integrally.

23. The suspension system of claim 20 further comprising;
a first hollow tube; and
a compression piston assembly slidably mounted in the first hollow tube and displaceable relative thereto to increase the pressure in the first fluid chamber.

24. The suspension system of claim 23 wherein the valve mechanism housing forms a portion of the first hollow tube.

25. The suspension system of claim 23 wherein the valve mechanism housing forms a portion of the compression piston assembly.

26. The suspension system of claim 23 wherein the suspension system further comprises a second hollow tube in fluid communication with the first hollow tube, wherein the valve mechanism housing forms a portion of the second hollow tube.

27. The suspension system of claim 18 further comprising a valve spring configured to bias the valve against the valve seat in the closed position.

28. The suspension system of claim 18 wherein the valve further comprises:
a valve head;
a valve stem; and
a valve spring associated with the valve stem and configured to bias the valve head against the valve seat in the closed position;
the valve stem of the valve in the sliding valve mechanism configured to collide against the valve actuating assembly when the blow-off pressure is reached in the first fluid chamber.

29. A suspension system comprising:
a valve mechanism housing;
a valve stop member; and
a valve mechanism including a valve seat and a valve,
the valve mechanism slidably mounted along the valve mechanism housing, the valve mechanism separating a first fluid chamber from a second fluid chamber and controlling fluid flow therebetween;
the valve displaceable relative to the valve seat and switchable between an open position in which fluid flow between the first and second fluid chambers is permitted, and a closed position in which fluid flow between the first and second fluid chambers is blocked, the valve configured to be positionable against the valve seat in the closed position;
the valve mechanism slidably displaceable by an increasing pressure in the first fluid chamber, the increasing pressure biasing the valve toward the closed position, the valve of the sliding valve mechanism configured to collide against the valve stop member when a blow-off pressure is reached in the first fluid chamber switching the valve from the closed position to the open position.

30. The suspension system of claim 29 further comprising a resilient member disposed between the valve seat and the valve mechanism housing and configured to be deformable by the valve mechanism as the valve mechanism is slidably displaced by an increasing pressure in the first fluid chamber.

31. The suspension system of claim 30 wherein the valve seat and resilient member are formed integrally.

32. The suspension system of claim 30 further comprising a seal disposed between the valve seat and the valve mechanism housing.

33. The suspension system of claim 32 wherein the resilient member and the seal are formed integrally.

34. The suspension system of claim 32 wherein the resilient member, the seal and the valve seat are formed integrally.

35. The suspension system of claim 32 further comprising;
a first hollow tube; and a compression piston assembly slidably mounted in the first hollow tube and displaceable relative thereto to increase the pressure in the first fluid chamber.

36. The suspension system of claim 35 wherein the valve mechanism housing forms a portion of the first hollow tube.

37. The suspension system of claim 35 wherein the valve mechanism housing forms a portion of the compression piston assembly.

38. The suspension system of claim 35 wherein the suspension system further comprises a second hollow tube in fluid communication with the first hollow tube, wherein the valve mechanism housing forms a portion of the second hollow tube.

39. The suspension system of claim 30 further comprising a valve spring configured to bias the valve against the valve seat in the closed position.

40. The suspension system of claim 30 wherein the valve further comprises:
a valve head;
a valve stem; and
a valve spring associated with the valve stem and configured to bias the valve head against the valve seat in the closed position;
the valve stem of the valve in the sliding valve mechanism configured to collide against the valve actuating assembly when the blow-off pressure is reached in the first fluid chamber.

41. A suspension system comprising:
a flow restrictive mechanism including a valve mechanism and a valve actuating assembly;
a valve mechanism housing; and
a resilient member disposed between the valve mechanism and the valve mechanism housing;
the valve mechanism slidably mounted along the valve mechanism housing, the valve mechanism separating a first fluid chamber from a second fluid chamber and controlling fluid flow therebetween;
the valve actuating assembly operably switching the valve mechanism between an open position in which fluid flow between the first and second fluid chambers is permitted and a restrictive position in which less fluid flow is permitted between the first and second fluid chambers than in the open position;
the resilient member configured to be deformable by the valve mechanism as the valve mechanism is slidably displaced by an increasing pressure in the first fluid chamber, the increasing pressure biasing the valve mechanism toward the restrictive position, the sliding valve mechanism configured to collide against the valve actuating assembly when a threshold pressure is reached in the first fluid chamber switching the valve mechanism from the restrictive position to the open position.

42. The suspension system of claim 41 wherein the valve mechanism further comprises:
a valve seat slidably mounted along the valve mechanism housing; and
a valve displaceable relative to the valve seat and positionable toward the valve seat in the restrictive position, the valve switchable between the open and restrictive positions, the valve of the sliding valve mechanism configured to collide against the valve actuating assembly when the restrictive pressure is reached in the first fluid chamber.

43. The suspension system of claim 42 wherein the resilient member is disposed between the valve seat and the valve mechanism housing.

44. The suspension system of claim 43 wherein the valve seat and resilient member are formed integrally.

45. The suspension system of claim 42 further comprising a seal disposed between the valve mechanism and the valve mechanism housing.

46. The suspension system of claim 45 wherein the seal is disposed between the valve seat and the valve mechanism housing.

47. The suspension system of claim 42 further comprising a valve spring configured to bias the valve toward the valve seat in the restrictive position.

48. The suspension system of claim 42 wherein the valve further comprises:
a valve head;
a valve stem; and
a valve spring associated with the valve stem and configured to bias the valve head toward the valve seat in the restrictive position;
the valve stem of the valve in the sliding valve mechanism configured to collide against the valve actuating assembly when the restrictive pressure is reached in the first fluid chamber.

49. The suspension system of claim 48 wherein the valve further comprises an orifice permitting restricted fluid flow between the first and second fluid chambers.

50. The suspension system of claim 41 further comprising;
a first hollow tube; and
a compression piston assembly slidably mounted in the first hollow tube and displaceable relative thereto to increase the pressure in the first fluid chamber.

51. The suspension system of claim 50 wherein the valve mechanism housing forms a portion of the first hollow tube.

52. The suspension system of claim 50 wherein the valve mechanism housing forms a portion of the compression piston assembly.

53. The suspension system of claim 50 wherein the suspension system further comprises a second hollow tube in fluid communication with the first hollow tube, wherein the valve mechanism housing forms a portion of the second hollow tube.

54. The suspension system of claim 41 wherein the valve actuating assembly is operably mounted to and displaceable relative to the valve mechanism housing.

55. The suspension system of claim 54 wherein the valve actuating assembly further comprises:
a driver displaceable relative to the valve mechanism housing to operatively engage the valve mechanism; and
an actuator operatively connected to the driver.

56. The suspension system of claim 55 wherein the driver further includes a follower and the actuator further comprises:
a knob connected to the actuator and operable by a rider; and
a cam operatively engaging the follower.

57. The suspension system of claim 55 wherein the valve mechanism further comprises:
a valve seat slidably mounted along the valve mechanism housing; and
a valve displaceable relative to the valve seat and positionable toward the valve seat in the restrictive position, the valve switchable between the open and restrictive positions, the valve of the sliding valve mechanism configured to collide against the driver when the restrictive pressure is reached in the first fluid chamber.

58. The suspension system of claim 57 wherein the valve stem is configured to collide against the driver.

59. The suspension system of claim 57 wherein the resilient member is disposed between the valve seat and the valve mechanism housing.

60. The suspension system of claim 59 wherein the valve seat and resilient member are formed integrally.

61. The suspension system of claim 59 further comprising a seal disposed between the valve seat and the valve mechanism housing.

62. The suspension system of claim 61 wherein the resilient member and the seal are formed integrally.

63. The suspension system of claim 61 wherein the resilient member, the seal and the valve seat are formed integrally.

64. The suspension system of claim 61 further comprising;
a first hollow tube; and
a compression piston assembly slidably mounted in the first hollow tube and displaceable relative thereto to increase the pressure in the first fluid chamber.

65. The suspension system of claim 64 wherein the valve mechanism housing forms a portion of the first hollow tube.

66. The suspension system of claim 64 wherein the valve mechanism housing forms a portion of the compression piston assembly.

67. The suspension system of claim 64 wherein the suspension system further comprises a second hollow tube in fluid communication with the first hollow tube, wherein the valve mechanism housing forms a portion of the second hollow tube.

68. The suspension system of claim 59 further comprising a valve spring configured to bias the valve toward the valve seat in the restrictive position.

69. The suspension system of claim 59 wherein the valve further comprises:
a valve head;
a valve stem; and
a valve spring associated with the valve stem and configured to bias the valve head toward the valve seat in the restrictive position;
the valve stem of the valve in the sliding valve mechanism configured to collide against the valve actuating assembly when the restrictive pressure is reached in the first fluid chamber.

70. A suspension system comprising:
a valve mechanism housing;
a valve stop member; and
a valve mechanism including a valve seat and a valve,
the valve mechanism slidably mounted along the valve mechanism housing, the valve mechanism separating a first fluid chamber from a second fluid chamber and controlling fluid flow therebetween;
the valve displaceable relative to the valve seat and switchable between an open position in which fluid flow between the first and second fluid chambers is permitted and a restrictive position in which less fluid flow is permitted between the first and second fluid chambers than in the open position, the valve configured to be positionable toward the valve seat in the restrictive position;
the valve mechanism slidably displaceable by an increasing pressure in the first fluid chamber, the increasing pressure biasing the valve toward the restrictive position, the valve of the sliding valve mechanism configured to collide against the valve stop member when a threshold pressure is reached in the first fluid chamber switching the valve from the restrictive position to the open position.

71. The suspension system of claim 70 further comprising a resilient member disposed between the valve seat and the valve mechanism housing and configured to be deformable by the valve mechanism as the valve mechanism is slidably displaced by an increasing pressure in the first fluid chamber.

72. The suspension system of claim 71 wherein the valve seat and resilient member are formed integrally.

73. The suspension system of claim 71 further comprising a seal disposed between the valve seat and the valve mechanism housing.

74. The suspension system of claim 73 wherein the resilient member and the seal are formed integrally.

75. The suspension system of claim 73 wherein the resilient member, the seal and the valve seat are formed integrally.

76. The suspension system of claim 73 further comprising;
a first hollow tube; and
a compression piston assembly slidably mounted in the first hollow tube and displaceable relative thereto to increase the pressure in the first fluid chamber.

77. The suspension system of claim 76 wherein the valve mechanism housing forms a portion of the first hollow tube.

78. The suspension system of claim 76 wherein the valve mechanism housing forms a portion of the compression piston assembly.

79. The suspension system of claim 76 wherein the suspension system further comprises a second hollow tube in fluid communication with the first hollow tube, wherein the valve mechanism housing forms a portion of the second hollow tube.

80. The suspension system of claim 71 further comprising a valve spring configured to bias the valve toward the valve seat in the restrictive position.

81. The suspension system of claim 71 wherein the valve further comprises:
a valve head;
a valve stem; and
a valve spring associated with the valve stem and configured to bias the valve head toward the valve seat in the restrictive position;
the valve stem of the valve in the sliding valve mechanism configured to collide against the valve actuating assembly when the restrictive pressure is reached in the first fluid chamber.

82. The suspension system of claim 81 wherein the valve further comprises an orifice permitting restricted fluid flow between the first and second fluid chambers.

* * * * *